US011449543B2

(12) United States Patent
Young et al.

(10) Patent No.: US 11,449,543 B2
(45) Date of Patent: *Sep. 20, 2022

(54) METHOD, APPARATUS, AND COMPUTER PROGRAM PRODUCT FOR VEHICLE LOCALIZATION VIA AMPLITUDE AUDIO FEATURES

(71) Applicant: HERE Global B.V., Eindhoven (NL)

(72) Inventors: Jeremy Michael Young, Chicago, IL (US); Leon Stenneth, Chicago, IL (US)

(73) Assignee: HERE Global B.V., Eindhoven (NL)

(*) Notice: Subject to any disclaimer, the term of this patent is extended or adjusted under 35 U.S.C. 154(b) by 309 days.

This patent is subject to a terminal disclaimer.

(21) Appl. No.: 16/868,171

(22) Filed: May 6, 2020

(65) Prior Publication Data

US 2021/0349939 A1 Nov. 11, 2021

(51) Int. Cl.
*G06F 16/687* (2019.01)
*G06F 16/635* (2019.01)
(Continued)

(52) U.S. Cl.
CPC ....... *G06F 16/635* (2019.01); *B60W 60/0011* (2020.02); *G06F 16/638* (2019.01);
(Continued)

(58) Field of Classification Search
CPC .... G06F 16/635; G06F 16/638; G06F 16/687; G06F 16/686; H04W 4/029;
(Continued)

(56) References Cited

U.S. PATENT DOCUMENTS 7,941,189 B2    5/2011  Miyauchi
9,288,594 B1 *  3/2016  Polansky ............... G10L 19/00
(Continued)

FOREIGN PATENT DOCUMENTS

CN   109410579 A    3/2019
EP   1 990 650 A1   11/2008
(Continued)

OTHER PUBLICATIONS

Mednis et al., *Roadmic: Road Surface Monitoring Using Vehicular Sensor Networks With Microphones*, International Conference on Networked Digital Technologies (2010) 13 pages.
(Continued)

*Primary Examiner* — Joseph Saunders, Jr.
(74) *Attorney, Agent, or Firm* — Jeffrey R. Moisan; HERE Technologies

(57) ABSTRACT

A method, apparatus and computer program product are provided for vehicle localization via amplitude audio features. In this regard, an amplitude audio signature of audio data received from one or more audio sensors of a vehicle is determined. Location data associated with the vehicle is also determined. Based on the location data for the vehicle, at least a portion of an audio feature map is selected. The audio feature map stores amplitude audio signatures associated with road noise in relation to respective locations. Furthermore, the amplitude audio signature of the audio data is compared with the amplitude audio signatures of the audio feature map. Based on the comparison between the amplitude audio signature of the audio data and the amplitude audio signatures of the audio feature map, a location of the vehicle is refined to generate updated location data for the vehicle.

20 Claims, 10 Drawing Sheets

(51) Int. Cl.
*G06F 16/638* (2019.01)
*H04W 4/029* (2018.01)
*G06F 16/68* (2019.01)
*B60W 60/00* (2020.01)
*G06F 3/16* (2006.01)

(52) U.S. Cl.
CPC .......... *G06F 16/686* (2019.01); *G06F 16/687* (2019.01); *H04W 4/029* (2018.02)

(58) Field of Classification Search
CPC ......... B60W 60/0011; B60W 60/0025; B60W 40/06; G10L 25/51; G01C 21/28
See application file for complete search history.

(56) References Cited

U.S. PATENT DOCUMENTS

| | | | |
|---|---|---|---|
| 9,377,528 | B2 | 6/2016 | Birken et al. |
| 9,995,587 | B2 | 6/2018 | Haberl |
| 10,445,597 | B2 | 10/2019 | Jackson |
| 2006/0100868 | A1 | 5/2006 | Hetherington et al. |
| 2018/0045520 | A1 | 2/2018 | Haberl |
| 2019/0003852 | A1 | 1/2019 | Paturle et al. |
| 2020/0348687 | A1* | 11/2020 | Paudel ............... G01S 5/30 |

FOREIGN PATENT DOCUMENTS

| WO | WO 2009/003876 A1 | 1/2009 |
|---|---|---|
| WO | WO 2019/047645 A1 | 3/2019 |

OTHER PUBLICATIONS

Valada, A. et al., *Deep Feature Learning for Acoustics-Based Terrain Classifcation*, Proc. of the Int. Symposium on Robotics Research (ISRR) (2015) 1-16.

U.S. Appl. No. 16/699,907, filed Dec. 2, 2019; in re: Young et al., entitled *Method, Apparatus, and Computer Program Product for Road Noise Mapping*.

U.S. Appl. No. 16/699,921, filed Dec. 2, 2019; in re: Young et al., entitled *Method, Apparatus, and Computer Program Product for Road Noise Mapping*.

U.S. Appl. No. 16/868,186, filed May 6, 2020; in re: Young et al., entitled: *Method, Apparatus, and Computer Program Product for Vehicle Localization Via Frequency Audio Features*.

* cited by examiner

METHOD, APPARATUS, AND COMPUTER PROGRAM PRODUCT FOR VEHICLE LOCALIZATION VIA AMPLITUDE AUDIO FEATURES

TECHNOLOGICAL FIELD

An example embodiment of the present disclosure relates to analysis of audio data from a vehicle to facilitate vehicle localization and, more particularly, to a method, apparatus and computer program product for vehicle localization via amplitude audio features.

BACKGROUND

Vehicles are being built with more and more sensors to assist with navigation, autonomous driving, and/or other vehicle technologies. Generally, sensors of a vehicle related to navigation and/or autonomous driving capture imagery data and/or radar data. For instance, image sensors and Light Distancing and Ranging (LiDAR) sensors are popular sensor types for identifying objects along a road segment and establishing the safe path of traversal for a vehicle driving autonomously. Data from the image sensors and/or the LiDAR sensors can then be employed for vehicle localization, for example, by reference to a viewable location in a map. However, image sensors and LiDAR sensors may be limited in terms of vehicle localization, such as in terms of the precision and/or confidence with which a vehicle may be located in certain circumstances. For example, image sensors and LIDAR sensors may generally lose effectiveness in certain types of environments such as, for example, low-visibility environments.

BRIEF SUMMARY

A method, apparatus and computer program product are provided in order to provide vehicle localization via amplitude audio features. The method, apparatus and computer program product of an example embodiment are configured to extract one or more amplitude sound signatures from a vehicle to, for example, facilitate vehicle localization for the vehicle. Additionally, the method, apparatus and computer program product of an example embodiment are configured to search for one or more matching audio signatures by comparing the one or more amplitude sound signatures to an audio feature map that stores predetermined audio signatures. The method, apparatus and computer program product of an example embodiment are also configured to update location data for the vehicle (e.g., location data obtained by a global positioning system of the vehicle) using geo-referenced locations associated with the one or more matching audio signatures. As such, precision of vehicle localization for a vehicle can be improved. Furthermore, improved navigation of a vehicle, improved route guidance for a vehicle, improved semi-autonomous vehicle control, and/or improved fully autonomous vehicle control can be provided.

In an example embodiment, a computer-implemented method is provided for vehicle localization based on amplitude audio features. The computer-implemented method includes determining an amplitude audio signature of audio data received from one or more audio sensors of a vehicle. The computer-implemented method also includes determining location data associated with the vehicle. The computer-implemented method also includes selecting, based on the location data for the vehicle, at least a portion of an audio feature map that stores amplitude audio signatures associated with road noise in relation to respective locations. Furthermore, the computer-implemented method includes comparing the amplitude audio signature of the audio data with the amplitude audio signatures of the audio feature map. The computer-implemented method also includes refining, based on the comparison between the amplitude audio signature of the audio data and the amplitude audio signatures of the audio feature map, a location of the vehicle to generate updated location data for the vehicle.

In an example embodiment, the determining the amplitude audio signature includes determining the amplitude audio signature in response to determining that a degree of variance of a decibel value associated with the audio data is above a noise threshold value. In another example embodiment, the determining the amplitude audio signature includes determining the amplitude audio signature in response to detection of a road noise event associated with an abnormality in a road surface associated with the vehicle. In yet another example embodiment, the refining the location for the vehicle includes updating the location data for the vehicle based on vehicle speed data for the vehicle and the comparison between the amplitude audio signature of the audio data and the amplitude audio signatures of the audio feature map.

In yet another example embodiment, the refining the location for the vehicle includes determining that the amplitude audio signature of the audio data matches a particular amplitude audio signature of the audio feature map. In this example embodiment, the computer-implemented method also includes refining the location for the vehicle based on a geo-referenced location associated with the particular amplitude audio signature of the audio feature map.

In yet another example embodiment, the refining the location for the vehicle includes comparing a probability value for the amplitude audio signature of the audio data with statistical values for the amplitude audio signatures of the audio feature map. In yet another example embodiment, the refining the location for the vehicle comprises comparing the amplitude audio signature of the audio data with a statistical distribution of the amplitude audio signatures of the audio feature map.

In an example embodiment, the audio data is first audio data received from a first audio sensor associated with a first wheel of the vehicle. In this example embodiment, the determining the amplitude audio signature comprises determining a first amplitude audio signature of the first audio data. Furthermore, in this example embodiment, the computer-implemented method also includes determining a second amplitude audio signature of second audio data received from a second audio sensor associated with a second wheel of the vehicle.

In an example embodiment in which the first audio sensor captures the first audio data and the second audio sensor captures the second audio data at approximately a same time, the first wheel is associated with a first side of the vehicle, and the second wheel is associated with a second side of the vehicle. In this example embodiment, the refining the location for the vehicle includes refining the location for the vehicle in a longitudinal direction with respect to a road associated with the vehicle.

In another example embodiment in which the first audio sensor captures the first audio data at a first time and the second audio sensor captures the second audio data at a second time, the first wheel and the second wheel are both associated with a same side of the vehicle. In this example embodiment, the refining the location for the vehicle includes refining the location for the vehicle in a latitudinal direction with respect to a road associated with the vehicle.

In another example embodiment, an apparatus is configured to provide vehicle localization based on amplitude audio features. The apparatus includes processing circuitry and at least one memory including computer program code instructions that are configured to, when executed by the processing circuitry, cause the apparatus to determine an amplitude audio signature of audio data received from one or more audio sensors of a vehicle. The computer program code instructions are also configured to, when executed by the processing circuitry, cause the apparatus to determine location data associated with the vehicle. The computer program code instructions are also configured to, when executed by the processing circuitry, cause the apparatus to select, based on the location data for the vehicle, at least a portion of an audio feature map that stores amplitude audio signatures associated with road noise in relation to respective locations. The computer program code instructions are further configured to, when executed by the processing circuitry, cause the apparatus to compare the amplitude audio signature of the audio data with the amplitude audio signatures of the audio feature map. The computer program code instructions are further configured to, when executed by the processing circuitry, cause the apparatus to assist localization of the vehicle based on the comparison between the amplitude audio signature of the audio data and the amplitude audio signatures of the audio feature map.

The computer program code instructions are further configured to, when executed by the processing circuitry, cause the apparatus of an example embodiment to assist the localization of the vehicle based on vehicle speed data for the vehicle and the comparison between the amplitude audio signature of the audio data and the amplitude audio signatures of the audio feature map. The computer program code instructions are further configured to, when executed by the processing circuitry, cause the apparatus of an example embodiment to assist the localization of the vehicle based on environmental data for the vehicle and the comparison between the amplitude audio signature of the audio data and the amplitude audio signatures of the audio feature map.

The computer program code instructions are further configured to, when executed by the processing circuitry, cause the apparatus of an example embodiment to determine that the amplitude audio signature of the audio data matches a particular amplitude audio signature of the audio feature map. In this example embodiment, the computer program code instructions are further configured to, when executed by the processing circuitry, cause the apparatus of an example embodiment to refine the location for the vehicle based on a geo-referenced location associated with the particular amplitude audio signature of the audio feature map.

The computer program code instructions are further configured to, when executed by the processing circuitry, cause the apparatus of an example embodiment to compute a probability that the amplitude audio signature of the audio data matches the amplitude audio signatures of the audio feature map. The computer program code instructions are further configured to, when executed by the processing circuitry, cause the apparatus of an example embodiment to compare a probability value for the amplitude audio signature of the audio data with statistical values for the amplitude audio signatures of the audio feature map. The computer program code instructions are further configured to, when executed by the processing circuitry, cause the apparatus of an example embodiment to compare the amplitude audio signature of the audio data with a statistical distribution of the amplitude audio signatures of the audio feature map.

In another example embodiment, a computer program product is provided for vehicle localization based on amplitude audio features. The computer program product includes at least one non-transitory computer readable storage medium having computer-executable program code instructions stored therein with the computer-executable program code instructions including program code instructions configured, upon execution, to determine an amplitude audio signature of audio data received from one or more audio sensors of a vehicle. The computer-executable program code instructions are also configured to determine location data associated with the vehicle. Furthermore, the computer-executable program code instructions are configured to select, based on the location data for the vehicle, at least a portion of an audio feature map that stores amplitude audio signatures associated with road noise in relation to respective locations. The computer-executable program code instructions are also configured to compare the amplitude audio signature of the audio data with the amplitude audio signatures of the audio feature map. The computer-executable program code instructions are also configured to refine, based on the comparison between the amplitude audio signature of the audio data and the amplitude audio signatures of the audio feature map, a location of the vehicle to generate updated location data for the vehicle.

The computer-executable program code instructions of an example embodiment are also configured to refine the location for the vehicle based on vehicle speed data for the vehicle and the comparison between the amplitude audio signature of the audio data and the amplitude audio signatures of the audio feature map. The computer-executable program code instructions of an example embodiment are also configured to refine the location for the vehicle based on environmental data for the vehicle and the comparison between the amplitude audio signature of the audio data and the amplitude audio signatures of the audio feature map.

The apparatus of another example embodiment includes means for determining an amplitude audio signature of audio data received from one or more audio sensors of a vehicle. The apparatus of an example embodiment also means for determining location data associated with the vehicle. The apparatus of an example embodiment also includes means for selecting, based on the location data for the vehicle, at least a portion of an audio feature map that stores amplitude audio signatures associated with road noise in relation to respective locations. Furthermore, the apparatus of an example embodiment also includes means for comparing the amplitude audio signature of the audio data with the amplitude audio signatures of the audio feature map. The apparatus of an example embodiment also includes means for refining, based on the comparison between the amplitude audio signature of the audio data and the amplitude audio signatures of the audio feature map, a location of the vehicle to generate updated location data for the vehicle The means for determining the amplitude audio signature in an example embodiment comprises means for determining the amplitude audio signature in response to determining that a degree of variance of a decibel value associated with the audio data is above a noise threshold value. The means for determining the amplitude audio signature in an example embodiment comprises means for determining the amplitude audio signature in response to detection of a road noise event associated with an abnormality in a road surface associated with the vehicle. The means for refining the location for the vehicle in an example embodiment comprises means for updating the location data for the vehicle based on vehicle speed data for the vehicle and the comparison between the amplitude audio signature of the audio data and the amplitude audio signatures of the audio feature map.

The means for refining the location for the vehicle in an example embodiment comprises means for determining that the amplitude audio signature of the audio data matches a particular amplitude audio signature of the audio feature map. Additionally, in this example embodiment, the means for refining the location for the vehicle in an example embodiment comprises means for refining the location for the vehicle based on a geo-referenced location associated with the particular amplitude audio signature of the audio feature map.

The means for refining the location for the vehicle in an example embodiment comprises means for comparing a probability value for the amplitude audio signature of the audio data with statistical values for the amplitude audio signatures of the audio feature map. The means for refining the location for the vehicle in an example embodiment comprises means for comparing the amplitude audio signature of the audio data with a statistical distribution of the amplitude audio signatures of the audio feature map.

In an example embodiment, the audio data is first audio data received from a first audio sensor associated with a first wheel of the vehicle, and the means for determining the amplitude audio signature comprises means for determining a first amplitude audio signature of the first audio data. In this example embodiment, the means for determining the amplitude audio signature also comprises means for determining a second amplitude audio signature of second audio data received from a second audio sensor associated with a second wheel of the vehicle.

In another example embodiment in which the first audio sensor captures the first audio data and the second audio sensor captures the second audio data at approximately a same time, the first wheel is associated with a first side of the vehicle, the second wheel is associated with a second side of the vehicle, and the means for refining the location for the vehicle comprises means for refining the location for the vehicle in a longitudinal direction with respect to a road associated with the vehicle.

In yet another example embodiment in which the first audio sensor captures the first audio data at a first time and the second audio sensor captures the second audio data at a second time, the first wheel and the second wheel are both associated with a same side of the vehicle, and the means for refining the location for the vehicle comprises means for refining the location for the vehicle in a latitudinal direction with respect to a road associated with the vehicle.

BRIEF DESCRIPTION OF THE DRAWINGS

Figure 1:
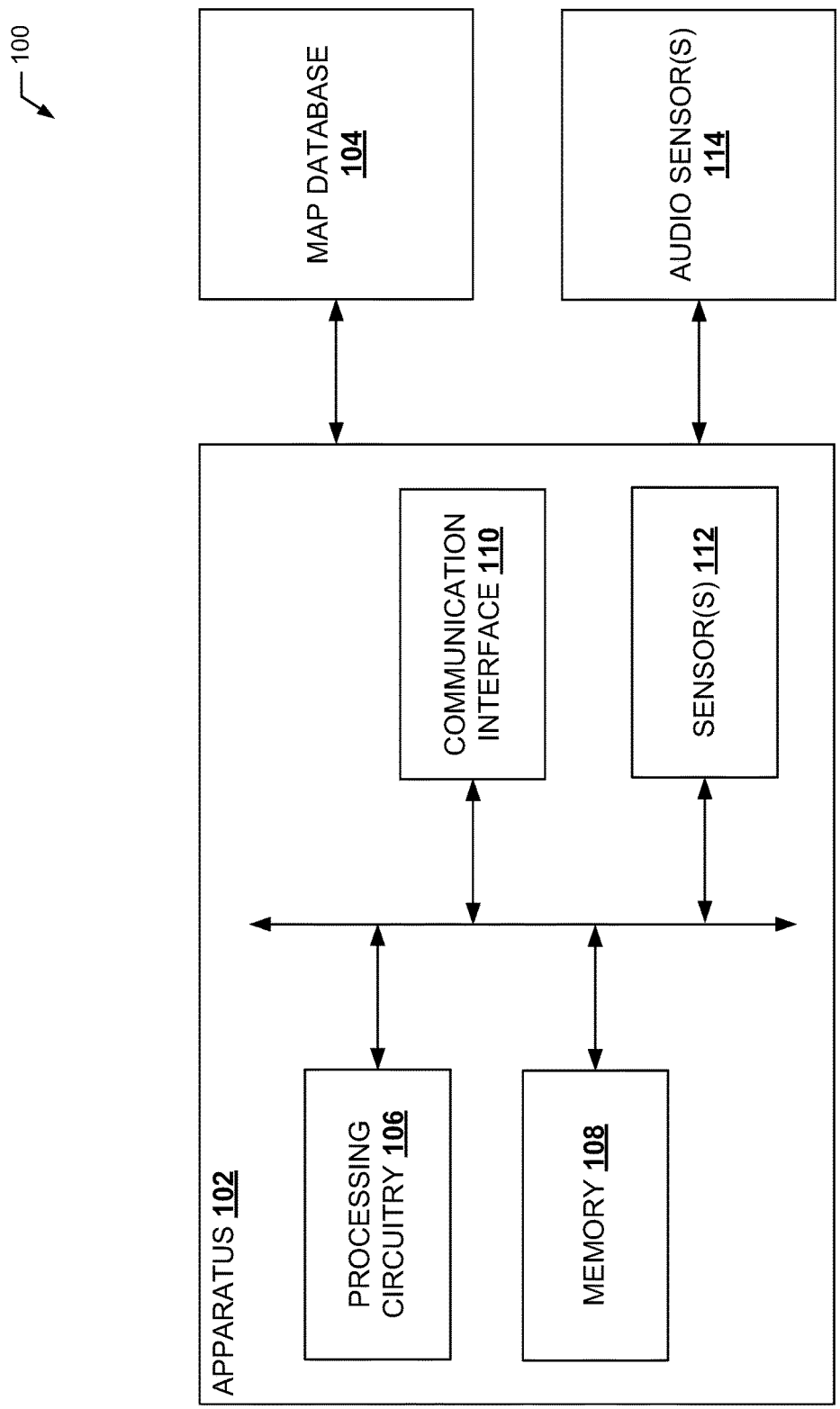
Figure 2:
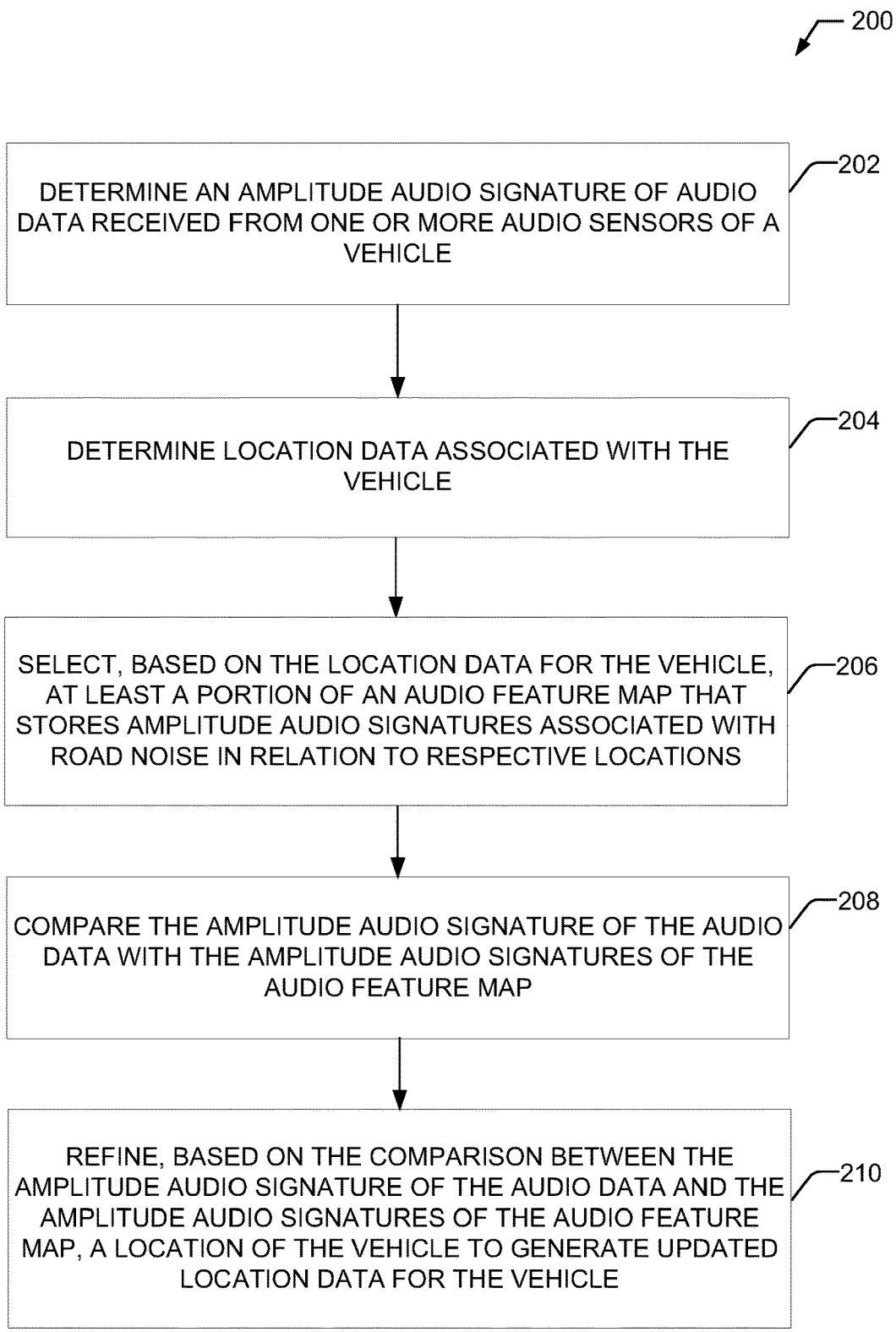
Figure 3:
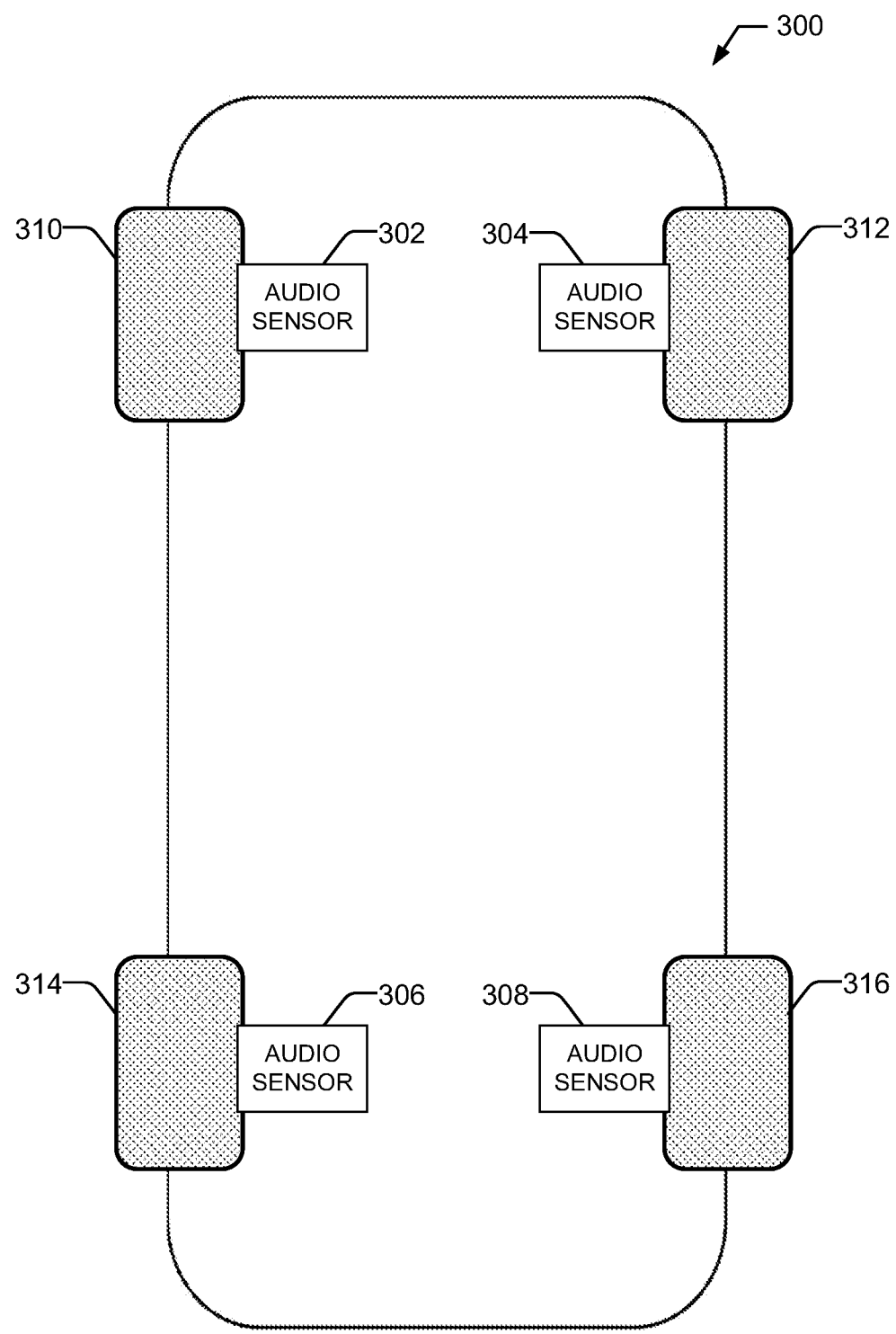
Figure 4:
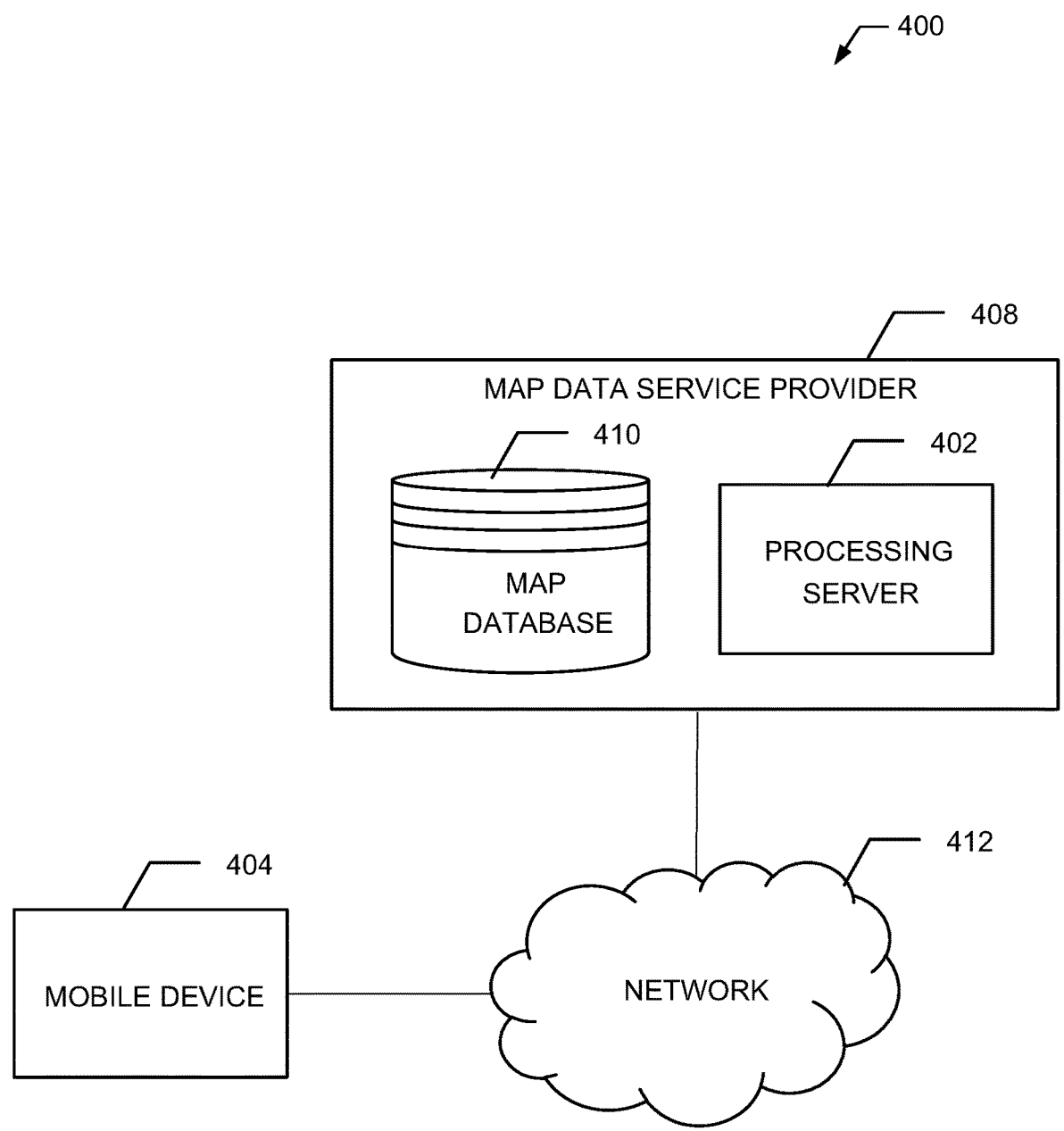
Figure 5:
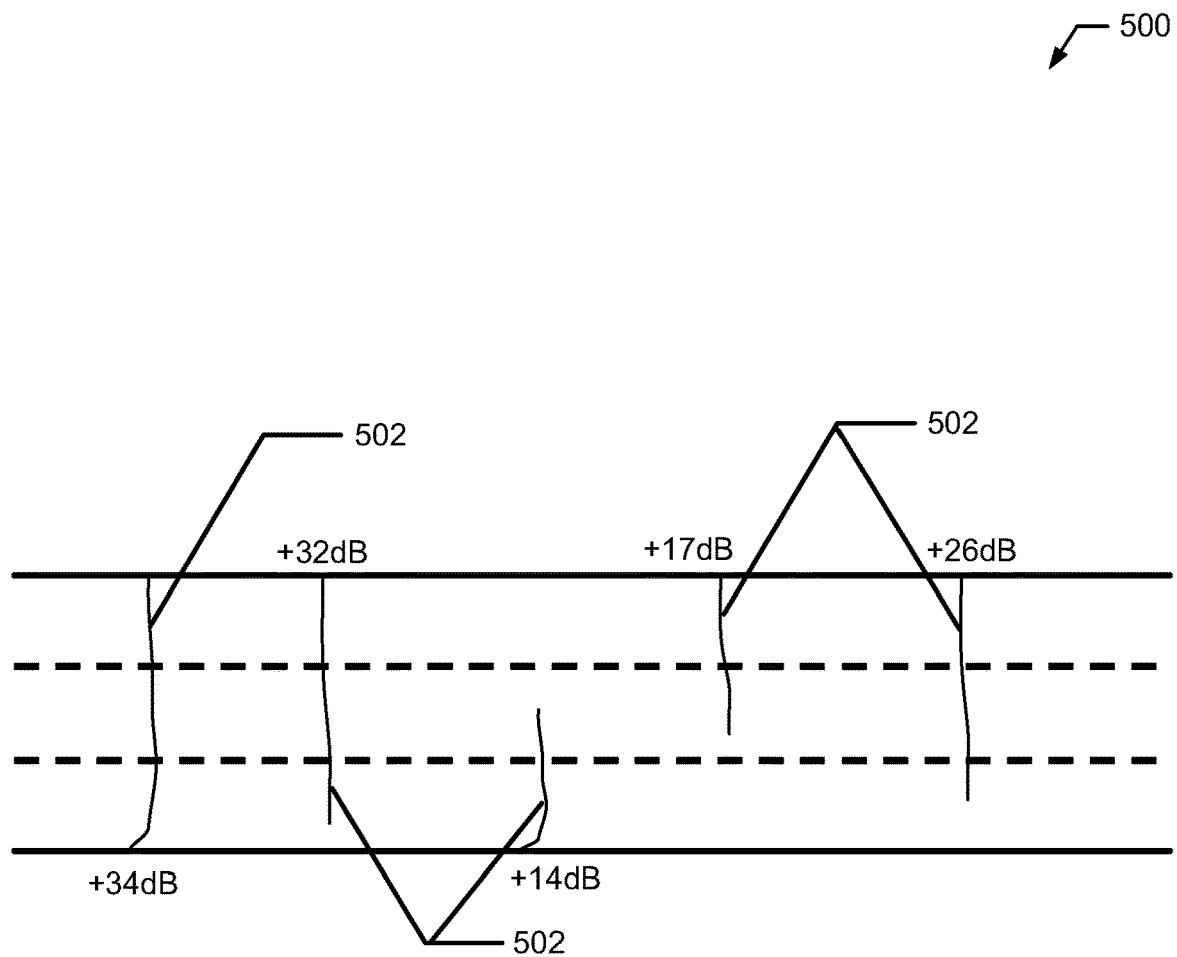
Figure 6:
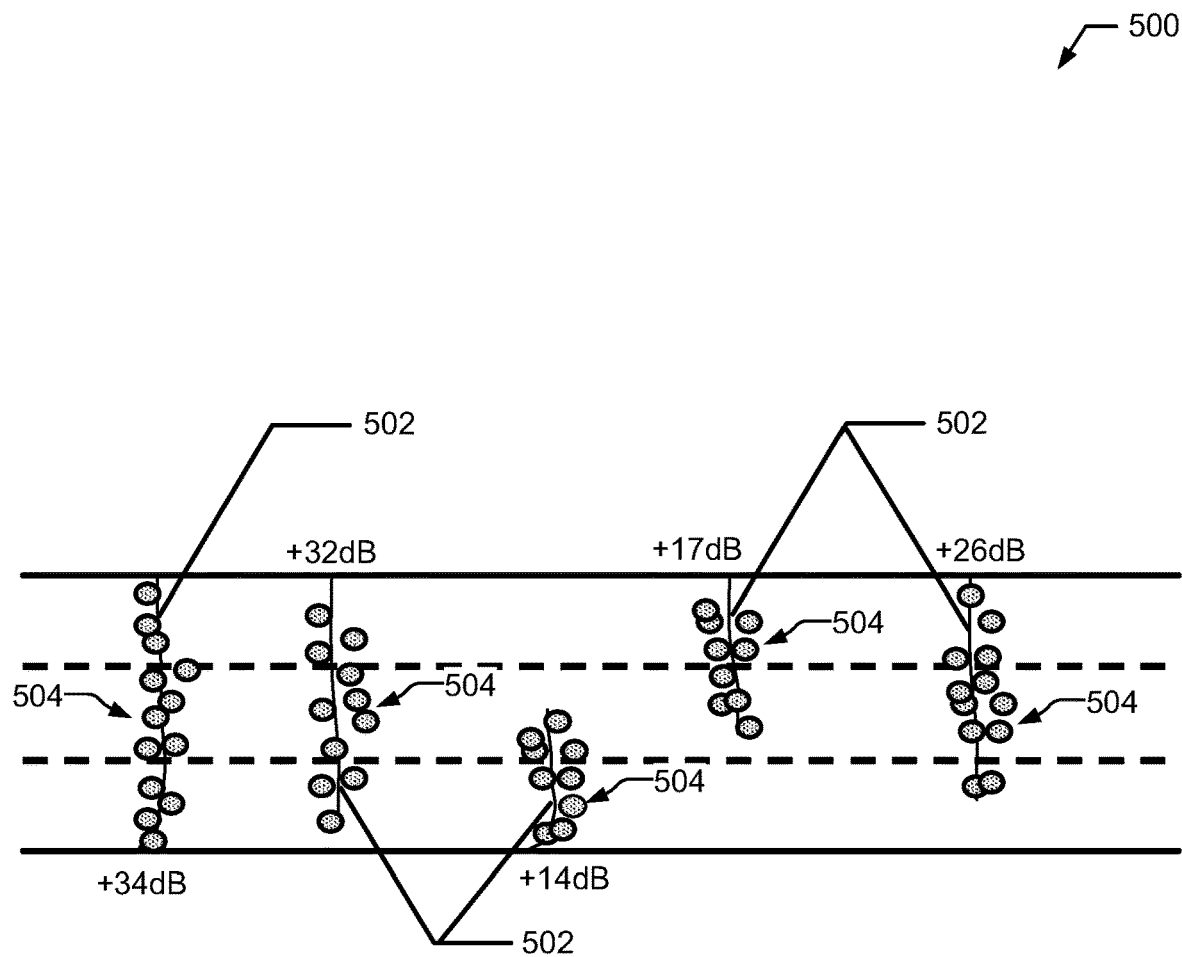
Figure 7:
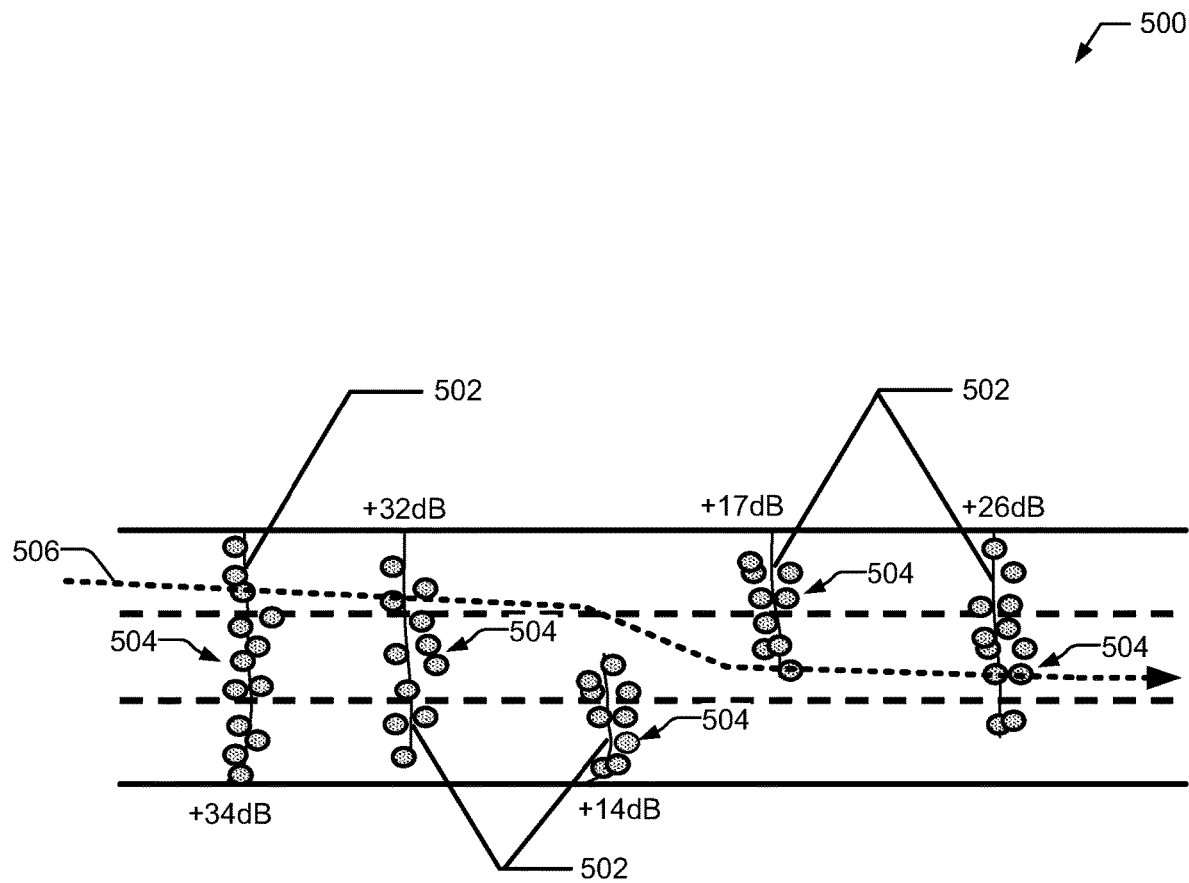
Figure 8:
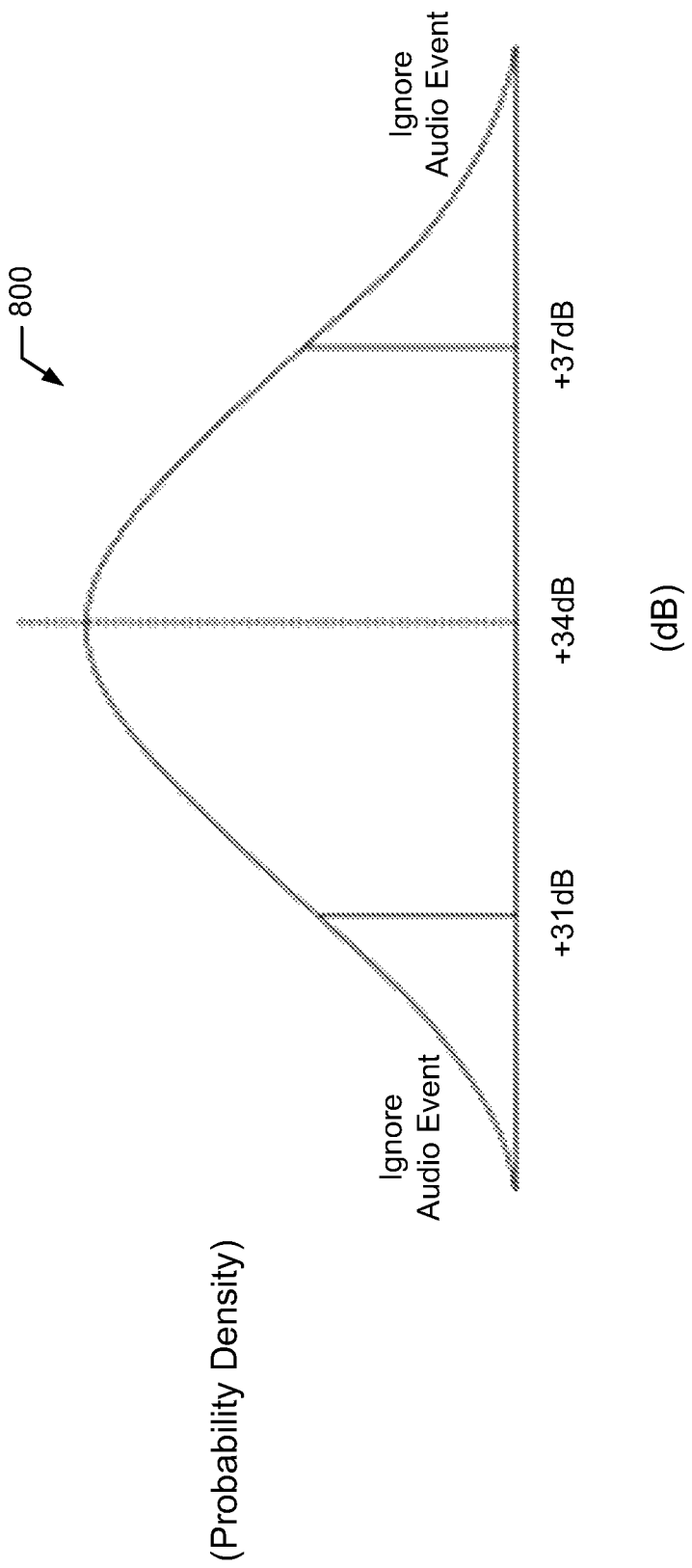
Figure 9:
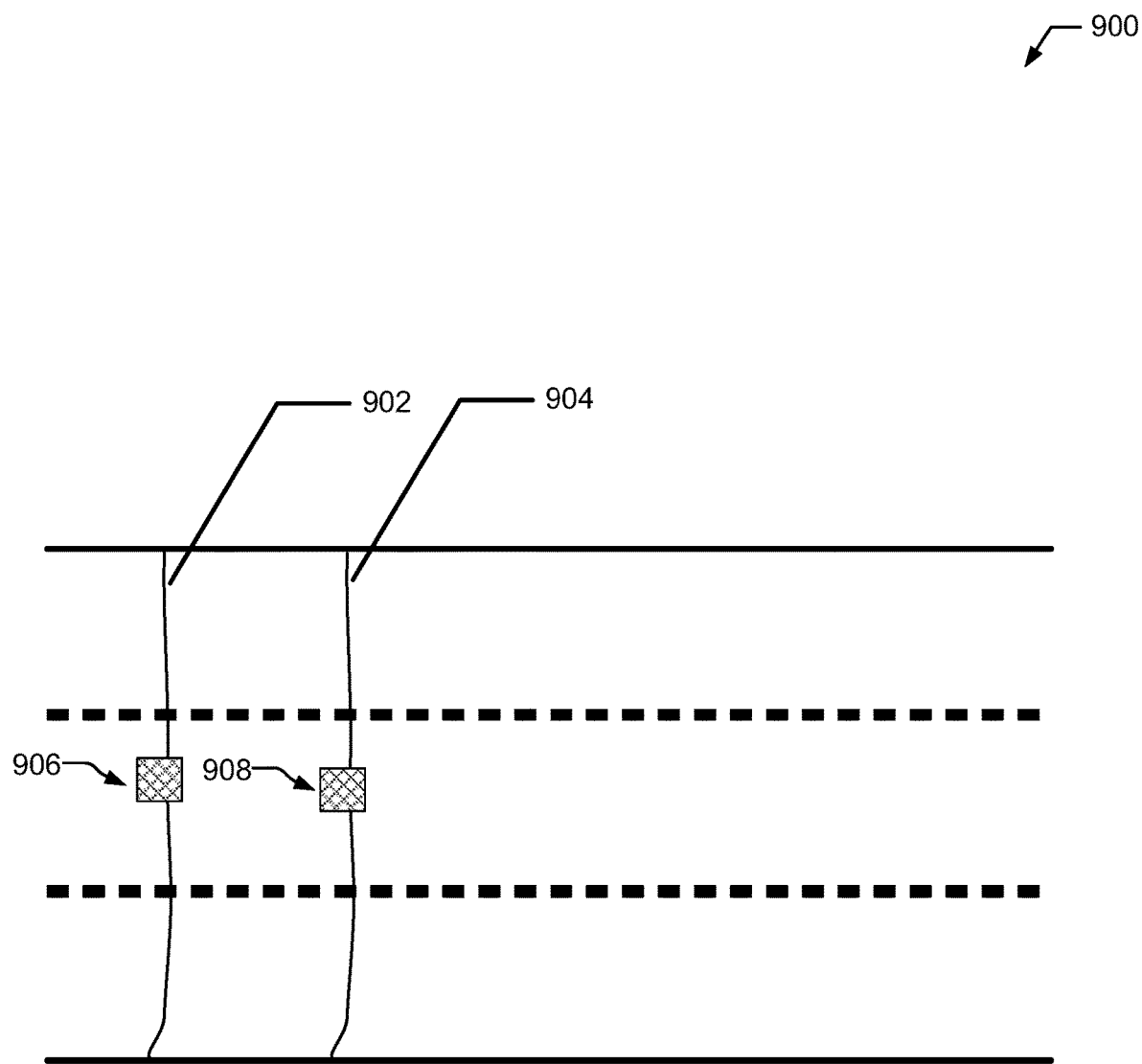
Figure 10:
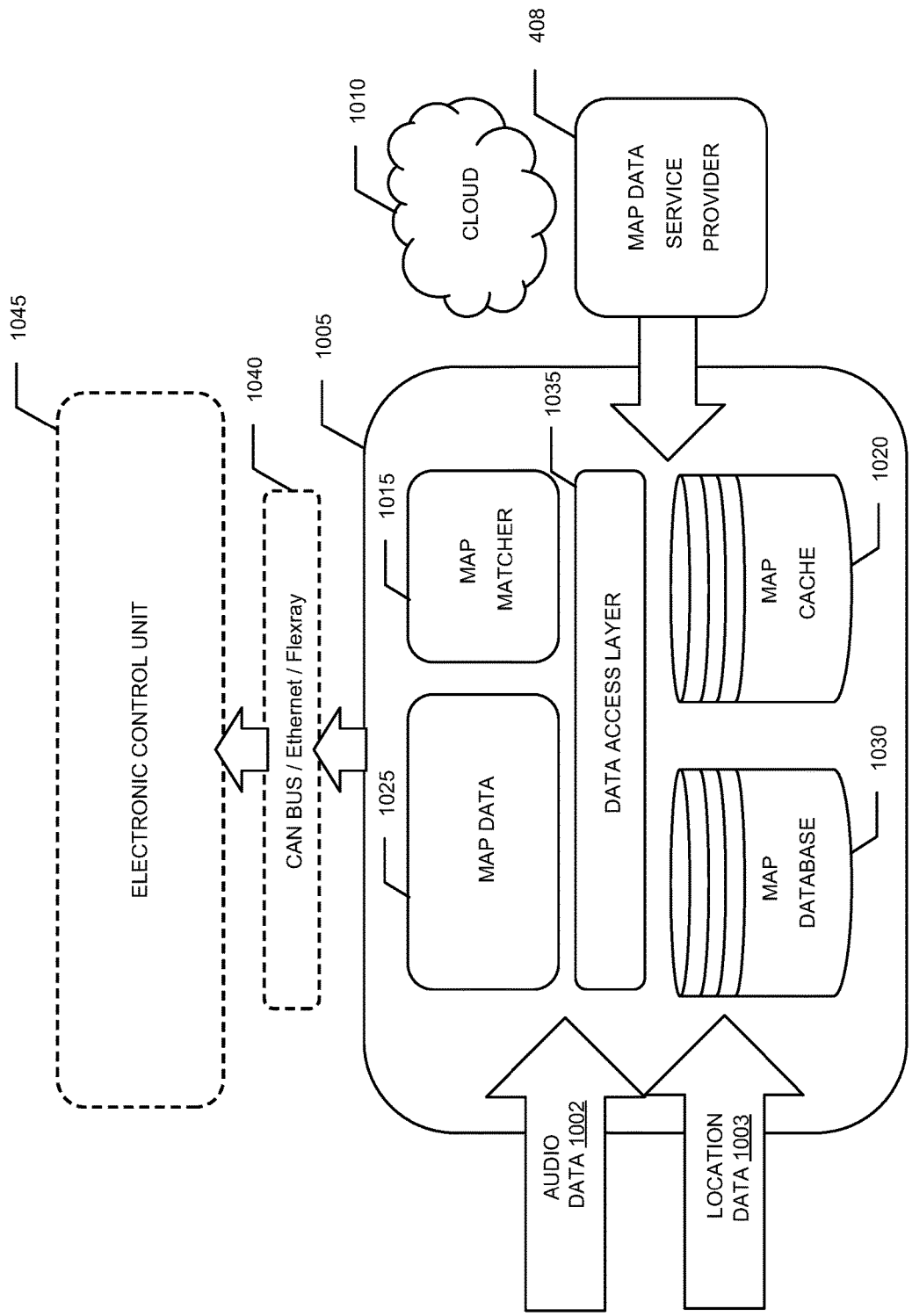

Having thus described certain embodiments of the disclosure in general terms, reference will now be made to the accompanying drawings, which are not necessarily drawn to scale, and wherein:

FIG. 1 is a block diagram of a system for providing vehicle localization based on amplitude audio features by an apparatus in accordance with one or more example embodiments of the present disclosure;

FIG. 2 is a flowchart illustrating operations performed, such as by the apparatus of FIG. 1, in order to provide for vehicle localization based on amplitude audio features in accordance with one or more example embodiments of the present disclosure;

FIG. 3 illustrates a sensor arrangement on a vehicle in accordance with one or more example embodiments of the present disclosure;

FIG. 4 is a block diagram of a system for using geo-referenced audio events to identify the location of a vehicle in accordance with one or more example embodiments of the present disclosure;

FIG. 5 illustrates a road segment including road abnormalities in accordance with one or more example embodiments of the present disclosure;

FIG. 6 illustrates audio events captured along the road segment of FIG. 5 in accordance with one or more example embodiments of the present disclosure;

FIG. 7 illustrates capturing of audio data with respect to the road segment of FIGS. 5 and 6 in accordance with one or more example embodiments of the present disclosure;

FIG. 8 illustrates a distribution of amplitude data in accordance with one or more example embodiments of the present disclosure;

FIG. 9 illustrates a plurality of distributions of amplitudes with respect to a road segment in accordance with one or more example embodiments of the present disclosure; and FIG. 10 is an example embodiment of an architecture specifically configured for implementing embodiments described herein.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to provide vehicle localization via amplitude audio features. In an embodiment, road noise mapping can be employed for vehicle localization via amplitude audio features. For instance, vehicle localization can be achieved by using a mapped audio feature of a determinable amplitude event. In certain embodiments, localization of a vehicle can be more precisely achieved using amplitude audio features in combination with location data provided by a global positioning system (GPS) of the vehicle. An amplitude audio feature can be, for example, an amplitude audio signature associated with an audio event (e.g., a percussive noise event, a road noise event, etc.). In an aspect, a GPS of a vehicle can be employed to obtain an approximate location of the vehicle. Furthermore, a map of amplitude audio features within a certain distance of the vehicle (e.g., as determined by the location data provided by the GPS of the vehicle) can be obtained. The map of amplitude audio features can, for example, correspond to audio events (e.g., percussive noises in a road surface). In another aspect, one or more audio sensors of the vehicle can be employed to capture audio data (e.g., audio features associated with a noise event) in a road traveled by the vehicle.

In an embodiment, the one or more audio sensors of the vehicle can be located proximate to one or more wheels of the vehicle, such as by being mounted on or otherwise carried by respective wheel(s) or the suspension or frame of the vehicle proximate the respective wheel(s). Amplitude audio features of the captured audio data can be compared against the map of amplitude audio features to assist localization of the vehicle. In an aspect, amplitude audio features of the captured audio data can be compared against the map of amplitude audio features and matched to a respective amplitude audio feature to more precisely determine a location of the vehicle. For example, based on the location of the actual audio event (e.g., a geo-referenced location associated with one or more matching amplitude audio features of the map), a more precise location of the vehicle can be determined. In certain embodiments, an even more precise location of the vehicle can be determined based on a speed of the vehicle, environmental data associated with the vehicle, and/or the location of the actual audio event (e.g., a geo-referenced location associated with one or more matching amplitude audio features of the map) in combination with the location of the actual audio event that matches the amplitude audio features of the captured audio data.

Accordingly, interpretation of amplitude variances detected in road noise made by tires of a vehicle in contact with the road (e.g., in response to a vehicle traveling along the road) can be employed in combination with mapped amplitude audio features of audio events to provide improved vehicle localization. Moreover, vehicle localization via amplitude audio features can provide additional dimensionality and/or advantages for one or more sensors of a vehicle. Vehicle localization via amplitude audio features can also provide a cost effective and/or efficient solution for improved vehicle localization. Computational resources for improved vehicle localization utilizing amplitude audio features can also be relatively limited in order to conserve the computational resources for other purposes. Vehicle localization via amplitude audio features may additionally facilitate improved navigation of a vehicle, improved route guidance for a vehicle, improved semi-autonomous vehicle control, and/or improved fully autonomous vehicle control.

With reference to FIG. 1, a system 100 configured to provide for vehicle localization via amplitude audio features is depicted, in accordance with one or more embodiments of the present disclosure. In the illustrated embodiment, the system 100 includes an apparatus 102 and a map database 104. As described further below, the apparatus 102 is configured in accordance with an example embodiment of the present disclosure to assist localization of a vehicle and/or to provide for vehicle localization via amplitude audio features. The apparatus 102 can be embodied by any of a wide variety of computing devices including, for example, a computer system of a vehicle, a vehicle system of a vehicle, a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System module (ADAS of a vehicle), or any other type of computing device.

In an example embodiment where some level of vehicle autonomy is involved, the apparatus 102 can be embodied or partially embodied by a computing device of a vehicle that supports safety-critical systems such as the powertrain (engine, transmission, electric drive motors, etc.), steering (e.g., steering assist or steer-by-wire), and/or braking (e.g., brake assist or brake-by-wire). However, as certain embodiments described herein may optionally be used for map generation, map updating, and map accuracy confirmation, other embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. Regardless of the type of computing device that embodies the apparatus 102, the apparatus 102 of an example embodiment includes, is associated with or otherwise is in communication with processing circuitry 106, memory 108 and optionally a communication interface 110.

In some embodiments, the processing circuitry 106 (and/or co-processors or any other processors assisting or otherwise associated with the processing circuitry 106) can be in communication with the memory 108 via a bus for passing information among components of the apparatus 102. The memory 108 can be non-transitory and can include, for example, one or more volatile and/or non-volatile memories. In other words, for example, the memory 108 be an electronic storage device (for example, a computer readable storage medium) comprising gates configured to store data (for example, bits) that can be retrievable by a machine (for example, a computing device like the processing circuitry 106). The memory 108 can be configured to store information, data, content, applications, instructions, or the like for enabling the apparatus 100 to carry out various functions in accordance with an example embodiment of the present invention. For example, the memory 108 can be configured to buffer input data for processing by the processing circuitry 106. Additionally or alternatively, the memory 108 can be configured to store instructions for execution by the processing circuitry 106.

The processing circuitry 106 can be embodied in a number of different ways. For example, the processing circuitry 106 be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 106 can include one or more processing cores configured to perform independently. A multi-core processor can enable multiprocessing within a single physical package. Additionally or alternatively, the processing circuitry 106 can include one or more processors configured in tandem via the bus to enable independent execution of instructions, pipelining and/or multithreading.

In an example embodiment, the processing circuitry 106 can be configured to execute instructions stored in the memory 108 or otherwise accessible to the processing circuitry 106. Alternatively or additionally, the processing circuitry 106 can be configured to execute hard coded functionality. As such, whether configured by hardware or software methods, or by a combination thereof, the processing circuitry 106 can represent an entity (for example, physically embodied in circuitry) capable of performing operations according to an embodiment of the present invention while configured accordingly. Thus, for example, when the processing circuitry 106 is embodied as an ASIC, FPGA or the like, the processing circuitry 106 can be specifically configured hardware for conducting the operations described herein. Alternatively, as another example, when the processing circuitry 106 is embodied as an executor of software instructions, the instructions can specifically configure the processing circuitry 106 to perform the algorithms and/or operations described herein when the instructions are executed. However, in some cases, the processing circuitry 106 can be a processor of a specific device (for example, a computing device) configured to employ an embodiment of the present disclosure by further configuration of the processor by instructions for performing the algorithms and/or operations described herein. The processing circuitry 106 can include, among other things, a clock, an arithmetic logic unit (ALU) and/or one or more logic gates configured to support operation of the processing circuitry 106.

The apparatus 102 of an example embodiment can also optionally include the communication interface 110 that can be any means such as a device or circuitry embodied in either hardware or a combination of hardware and software that is configured to receive and/or transmit data from/to other electronic devices in communication with the apparatus 102, such as the map database 104 that stores data (e.g., an audio feature map, a map of amplitude audio features, amplitude data, vehicle speed data, statistical data, time data, location data, geo-referenced locations, etc.) generated and/or employed by the processing circuitry 106. Additionally or alternatively, the communication interface 110 can be configured to communicate in accordance with various wireless protocols including Global System for Mobile Communications (GSM), such as but not limited to Long Term Evolution (LTE). In this regard, the communication interface 110 can include, for example, an antenna (or multiple antennas) and supporting hardware and/or software for enabling communications with a wireless communication network. In this regard, the communication interface 110 can include, for example, an antenna (or multiple antennas) and supporting hardware and/or software for enabling communications with a wireless communication network. Additionally or alternatively, the communication interface 110 can include the circuitry for interacting with the antenna(s) to cause transmission of signals via the antenna(s) or to handle receipt of signals received via the antenna(s). In some environments, the communication interface 110 can alternatively or also support wired communication and/or may alternatively support vehicle to vehicle or vehicle to infrastructure wireless links.

In certain embodiments, the apparatus 102 can be equipped or associated with one or more sensors 112, such as one or more GPS sensors, one or more accelerometer sensors, one or more LiDAR sensors, one or more radar sensors, one or more gyroscope sensors, and/or one or more other sensors. Any of the one or more sensors 112 may be used to sense information regarding movement, positioning, and/or orientation of the apparatus 102 for use in navigation assistance and/or autonomous vehicle control, as described herein according to example embodiments.

In certain embodiments, the apparatus 102 may further be equipped with or in communication with one or more audio sensors 114. In an example, embodiment, the one or more audio sensors can be one or more audio capturing devices (e.g., one or more microphones). In some example embodiments, the one or more audio sensors 114 can be implemented in a vehicle or other remote apparatus. For example, the one or more audio sensors 114 can be located approximate to one or more wheels of a vehicle. In certain embodiments, information detected by the one or more audio sensors 114 can be transmitted to the apparatus 102 as audio data. In certain embodiments, the audio data transmitted by the one or more audio sensors 114 can be transmitted via one or more wired communications and/or one or more wireless communications (e.g., near field communication, or the like). In some environments, the communication interface 110 can support wired communication and/or wireless communication with the one or more audio sensors 114.

FIG. 2 illustrates a flowchart depicting a method 200 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 108 of the apparatus 102 employing an embodiment of the present invention and executed by the processing circuitry 106. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 2, the operations performed, such as by the apparatus 102 of FIG. 1, in order to provide for vehicle localization via amplitude audio features are depicted, in accordance with one or more embodiments of the present disclosure. As shown in block 202 of FIG. 2, the apparatus 102 includes means, such as the processing circuitry 106, the memory 108, or the like, configured to determine an amplitude audio signature of audio data received from one or more audio sensors of a vehicle. In an embodiment, the audio data can be associated with road noise generated by the vehicle. For instance, the road noise generated by the vehicle can be captured as audio data by the one or more audio sensors of the vehicle. Road noise, as described herein, is noise generated based on a contact between tires of the vehicle and a road surface along which the vehicle is traveling. The audio data can include, for example, one or more audio events that rise to a level of significant or otherwise measurable deviations from steady-state road noise. Furthermore, the one or more audio sensors of the vehicle can transmit the audio data to the apparatus 102, such as the processing circuitry 106.

An example of an audio event may include a portion of the audio data that reflects a statistically significant change in amplitude of road noise generated by the vehicle. For example, the apparatus 102, such as the processing circuitry 106, can detect an audio event in response to a determination that the audio data provided by the one or more audio sensors of the vehicle corresponds to a statistically significant change in amplitude. In an aspect, an audio event can correspond to a change in amplitude measured in decibels with respect to one or more percussive sound events in the road such as road seams, cracks, potholes, etc. In another aspect, to facilitate detection of changes in amplitude, a baseline road noise level can be defined and then employed to compare with respect to changes in amplitude of the audio data measured by the one or more audio sensors of the vehicle. For example, a threshold level that represents a certain degree of deviation with respect to a noise floor (e.g., a threshold level that corresponds to a predefined offset with respect to a noise floor) can be employed to detect one or more audio events. A portion of the audio data detected above or below the threshold level by a predefined amount, such as a deviation of a predefined decibel amount or a deviation of at least a predefined percent of the threshold level, can be identified as an audio event. In certain embodiments, the apparatus 102, such as the processing circuitry 106, can determine the amplitude audio signature in response to determining that a degree of variance of a decibel value associated with the audio data is above or below a noise threshold value by a predefined amount. For example, the degree of variance of the decibel value associated with the audio data can be a measure of deviation from the noise floor. In certain embodiments, the apparatus 102, such as the processing circuitry 106, can determine the amplitude audio signature in response to detection of a road noise event associated with an abnormality in a road surface associated with the vehicle.

The amplitude audio signature can be an amplitude audio feature associated with the audio data. In an aspect, the amplitude audio signature can correspond to a portion of the audio data that deviates from the noise floor by a certain amount. In an embodiment, the apparatus 102, such as the processing circuitry 106, can extract the amplitude audio signature from the audio data. For example, the apparatus 102, such as the processing circuitry 106, can be configured to extract an amplitude audio feature of an audio event associated with the audio data, where the amplitude audio feature can include at least a predefined degree of amplitude change in the audio data relative to the noise threshold value. In another embodiment, the amplitude audio signature can identify one or more audio event properties associated with amplitude and/or a change in amplitude. In an example, the amplitude audio signature can correspond to a certain degree of change in decibels related to a road noise event relative to the noise threshold value. Additionally, in certain embodiments, the apparatus 102, such as the processing circuitry 106, can determine a timestamp for the audio signature. The timestamp can correspond to a time and/or a date of the capture of the portion of the audio data by the one or more audio sensors 114. In certain embodiments, the apparatus 102, such as the processing circuitry 106, can additionally or alternatively associate a location with the amplitude audio signature based on location data determined by the one or more sensors 112 (e.g., a GPS sensor or another location sensor) at the time and/or date of the capture of the portion of the audio data by the one or more audio sensors 114.

An example of the vehicle that generates the audio data is depicted in FIG. 3. As shown in FIG. 3, a vehicle 300 includes one or more audio sensors such as audio sensor 302, audio sensor 304, audio sensor 306 and/or audio sensor 308. The audio sensor 302, the audio sensor 304, the audio sensor 306 and/or the audio sensor 308 can be configured to collect road noise data as the audio data. For instance, in an embodiment, the audio sensor 302 can collect first audio data associated with road noise, the audio sensor 304 can collect second audio data associated with road noise, the audio sensor 306 can collect third audio data associated with road noise, and the audio sensor 308 can collect fourth audio data associated with road noise. In certain embodiments, the audio sensor 302 can be a first microphone, the audio sensor 304 can be a second microphone, the audio sensor 306 can be a third microphone, and the audio sensor 308 can be a fourth microphone. For example, the audio sensor 302 can be a first directional microphone, the audio sensor 304 can be a second directional microphone, the audio sensor 306 can be a third directional microphone, and the audio sensor 308 can be a fourth directional microphone. In certain embodiments, the audio sensor 302 can collect first audio data associated with road noise, the audio sensor 304 can collect second audio data associated with road noise, the audio sensor 306 can collect third audio data associated with road noise, and/or the audio sensor 308 can collect fourth audio data associated with road noise at approximately the same time. As used herein, "approximately the same time" is defined as two or more times that are equal or differ by no more than a predefined amount. In certain embodiments, the apparatus 102, such as the processing circuitry 106, can determine a first amplitude audio signature of first audio data provided by the audio sensor 302, a second amplitude audio signature of second audio data provided by the audio sensor 304, a third amplitude audio signature of third audio data provided by the audio sensor 306, and/or a fourth amplitude audio signature of fourth audio data provided by the audio sensor 308.

In an example embodiment, the vehicle 300 can be implemented with a single audio sensor (e.g., the audio sensor 302, the audio sensor 304, the audio sensor 306 or the audio sensor 308). In such an embodiment, the single audio sensor (e.g., the audio sensor 302, the audio sensor 304, the audio sensor 306 or the audio sensor 308) can be configured for directional audio detection and/or can be positioned to capture audio from multiple points with respect to the vehicle 300. In another example embodiment, the audio sensor 302, the audio sensor 304, the audio sensor 306, and/or the audio sensor 308 can be configured as a sensor array for the vehicle 300. For example, the audio sensor 302 can be associated with a wheel 310 of the vehicle 300, the audio sensor 304 can be associated with a wheel 312 of the vehicle 300, the audio sensor 306 can be associated with a wheel 314 of the vehicle 300, and/or the audio sensor 308 can be associated with a wheel 316 of the vehicle 300. In certain embodiments, the audio sensor 302 can be located inside a body of the wheel 312, between a wheel rim of the wheel 312 and a tire associated with the wheel 312, or inside a wheel well of the wheel 312 to shield the audio sensor 302 from surrounding noise. Furthermore, the audio sensor 304, the audio sensor 306, and/or the audio sensor 308 can be implemented in a similar manner with respect the wheel 312, the wheel 314 and/or the wheel 316. In an aspect, the wheel 310 and the wheel 314 can be associated with a first side of the vehicle (e.g., a left side of the vehicle). Furthermore, the wheel 312 and the wheel 316 can be associated with a second side of the vehicle (e.g., a right side of the vehicle). In another aspect, the wheel 310 and the wheel 312 can be associated with a front axle of the vehicle. Furthermore, the wheel 314 and the wheel 316 can be associated with a rear axle of the vehicle.

As shown in block 204 of FIG. 2, the apparatus 102 includes means, such as the processing circuitry 106, the memory 108, or the like, configured to determine location data associated with the vehicle. The location data can include information associated with a geographic location of the vehicle. For instance, the location data can include geographic coordinates for the vehicle. In an embodiment, the location data can include latitude data and/or longitude data defining the location of the vehicle. In an aspect, the apparatus 102, such as the processing circuitry 106, can receive the location data from the one or more sensors 112. For example, in an embodiment, the apparatus 102, such as the processing circuitry 106, can receive the location data from a GPS or other location sensor of the vehicle. In another embodiment, the apparatus 102, such as the processing circuitry 106, can receive the location data from a LiDAR sensor of the vehicle. In yet another embodiment, the apparatus 102, such as the processing circuitry 106, can receive the location data from one or more ultrasonic sensors and/or one or more infrared sensors of the vehicle.

In certain embodiments, the apparatus 102 can support a mapping or navigation application so as to present maps or otherwise provide navigation or driver assistance, such as in an example embodiment in which map data is created or updated using methods described herein. For example, the apparatus 102 can provide for display of a map and/or instructions for following a route within a network of roads via a user interface (e.g., a graphical user interface). In order to support a mapping application, the apparatus 102 can include or otherwise be in communication with a geographic database, such as can be stored in the memory 108. For example, the geographic database can include node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology can be used, such as electronic horizon sensors, radar, LiDAR, ultrasonic sensors and/or infrared sensors.

In example embodiments, a navigation system user interface can be provided to provide driver assistance to a user traveling along a network of roadways where road noise collected from the vehicle (e.g., the vehicle 300) associated with the navigation system user interface can aid in establishing a position of the vehicle along a road segment and optionally within a lane of the road segment. Optionally, embodiments described herein can provide assistance for autonomous or semi-autonomous vehicle control. Autonomous vehicle control can include driverless vehicle capability where all vehicle functions are provided by software and hardware to safely drive the vehicle along a path identified by the vehicle. Semi-autonomous vehicle control can be any level of driver assistance from adaptive cruise control, to lane-keep assist, or the like. Establishing vehicle location and position along a road segment can provide information useful to navigation and autonomous or semi-autonomous vehicle control by establishing an accurate and highly specific position of the vehicle on a road segment and even within a lane of the road segment such that map features in the map, e.g., a high definition (HD) map, associated with the specific position of the vehicle can be reliably used to aid in guidance and vehicle control.

A map service provider database can be used to provide driver assistance, such as via a navigation system and/or through an Advanced Driver Assistance System (ADAS) having autonomous or semi-autonomous vehicle control features. FIG. 4 illustrates a communication diagram of an example embodiment of a system for implementing example embodiments described herein. The illustrated embodiment of FIG. 4 includes a mobile device 404, which can be, for example, the apparatus 102 of FIG. 1, such as a mobile phone, an in-vehicle navigation system, an ADAS, or the like. The illustrated embodiment of FIG. 4 also includes a map data service provider 408. The mobile device 404 and the map data service provider 408 can be in communication via a network 412. The network 412 can be any form of wireless or partially wireless network as will be described further below. Additional, different, or fewer components can be provided. For example, many mobile devices 404 can connect with the network 412. In an embodiment, the map data service provider can be a cloud service. For instance, in certain embodiments, the map data service provider 408 can provide cloud-based services and/or can operate via a hosting server that receives, processes, and provides data to other elements of the system 400.

The map data service provider 408 can include a map database 410 that can include node data, road segment data or link data, point of interest (POI) data, traffic data or the like. In one embodiment, the map database 410 can be different than the map database 104. In another embodiment, at least a portion of the map database 410 can correspond to the map database 104. The map database 410 can also include cartographic data, routing data, and/or maneuvering data. According to some example embodiments, the road segment data records can be links or segments representing roads, streets, or paths, as can be used in calculating a route or recorded route information for determination of one or more personalized routes. The node data can be end points corresponding to the respective links or segments of road segment data. The road link data and the node data can represent a road network, such as used by vehicles, cars, trucks, buses, motorcycles, and/or other entities. Optionally, the map database 410 can contain path segment and node data records or other data that can represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 410 can include data about the POIs and their respective locations in the POI records. The map database 410 can include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 410 can include event data (e.g., traffic incidents, construction activities, scheduled events, unscheduled events, etc.) associated with the POI data records or other records of the map database 410.

The map database 410 can be maintained by the map data service provider 408 and can be accessed, for example, by a processing server 402 of the map data service provider 408. By way of example, the map data service provider 408 can collect geographic data and/or dynamic data to generate and enhance the map database 410. In one example, the dynamic data can include traffic-related data. There can be different ways used by the map data service provider 408 to collect data. These ways can include obtaining data from other sources, such as municipalities or respective geographic authorities, such as via global information system databases. In addition, the map data service provider 408 can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that can be available is vehicle data provided by vehicles, such as mobile device 404, as they travel the roads throughout a region.

In certain embodiments, at least a portion of the map database 104 can be included in the map database 410. In an embodiment, the map database 410 can be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems. For example, geographic data can be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 404, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 410 of the map data service provider 408 can be a master geographic database, but in alternate embodiments, a client side map database can represent a compiled navigation database that can be used in or with end user devices (e.g., mobile device 404) to provide navigation and/or map-related functions. For example, the map database 410 can be used with the mobile device 404 to provide an end user with navigation features. In such a case, the map database 410 can be downloaded or stored on the end user device which can access the map database 410 through a wireless or wired connection, such as via a processing server 402 and/or the network 412, for example.

Further details are provided by U.S. patent application Ser. No. 16/699,907 filed Dec. 2, 2019 and U.S. patent application Ser. No. 16/699,921 filed Dec. 2, 2019, the entire contents of each of which are expressly incorporated by reference herein in their entirety.

In one embodiment, as noted above, the end user device or mobile device 404 can be embodied by the apparatus 102 of FIG. 1 and can include an ADAS which can include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 404 for navigation and map functions such as guidance and map display, for example, and for determination of useful driver assistance information, according to some example embodiments.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time or near real-time sensing of the environment can provide information about potential obstacles, the behavior of others on the roadway, and areas that are navigable by the vehicle. An understanding of location of other vehicles and/or what the other vehicles can do is critical for a vehicle (or apparatus 102) to safely plan a route. However, redundant mechanisms are of import to ensure reliable operation of vehicles in environments to compensate for when one sensor or array of sensors is compromised. Embodiments described herein employ one or more audio sensors of the vehicle (e.g., the audio sensor 302, the audio sensor 304, the audio sensor 306 and/or the audio sensor 308) to collect road noise sounds to identify a location of the vehicle along a road segment which can provide vehicle localization to enhance location data and/or in scenarios when one or more other mechanisms, such as GPS, vision techniques, and local signal fingerprinting can be diminished.

Accurate localization of a vehicle is useful for autonomous vehicle control. Such localization enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, potholes, etc.) and temporary road changes.

Autonomous vehicle navigation relies heavily on GPS which can generally provide a real-time location with a high level of confidence. However, in complex urban environments, for example, reflection of GPS signals in "urban canyons" can increase the error such that location can be off by as much as 30 meters or more. Given that the width of many vehicle lanes is typically four meters or less, this accuracy is insufficient to properly localize an autonomous vehicle to enable accurate route planning decisions. Other sensors, such as inertial measurement units (IMUs) can increase the accuracy of localization by taking into account vehicle movement, but these sensors can drift and fail to provide sufficient accuracy. Autonomous vehicle navigation requires localization accuracy, and accuracy to within 10 centimeters can provide sufficient accuracy for effectiveness of autonomous navigation. One way to achieve this level of accuracy, as described herein, is through the use of geo-referenced audio events corresponding to road segments.

Autonomous vehicles or vehicles with some level of autonomous controls provide some degree of vehicle control that was previously performed by a person driving a vehicle. Removing some or all of the responsibilities of driving from a person and automating those responsibilities require a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features, such as based on the road noise generated by the vehicle as it travels along the road segment as described herein. As such, it is desirable for the autonomous vehicle to be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

As shown in block 206 of FIG. 2, the apparatus 102 includes means, such as the processing circuitry 106, the memory 108, or the like, configured to select, based on the location data for the vehicle, at least a portion of an audio feature map that stores amplitude audio signatures associated with road noise in relation to respective locations. For instance, the apparatus 102, such as the processing circuitry 106, can employ the location data for the vehicle to select an audio feature map from a set of audio feature maps stored in the map database 104 and/or the map database 410, such as in an audio layer of the map database 104. The audio feature map selected by the apparatus 102, such as the processing circuitry 106, can be an audio feature map that stores amplitude audio signatures associated with road noise in relation to respective locations within a certain distance from the location data. For example, audio feature map selected by the apparatus 102, such as the processing circuitry 106, can be an audio feature map that stores amplitude audio signatures associated with road noise in relation to respective locations within 200 m or another predefined distance from the position of the vehicle as defined by the location data provided by the one or more sensors 112. As such, amplitude audio signatures and/or audio feature maps that are irrelevant to a location of the vehicle can be ignored to, for example, reduce an amount of computational processing by the apparatus 102, such as the processing circuitry 106. In certain embodiments, the apparatus 102, such as the processing circuitry 106, can select at least the portion of the audio feature map in response to a determination that an accuracy of the location data satisfies a defined accuracy criterion. For example, the apparatus 102, such as the processing circuitry 106, can select at least the portion of the audio feature map in response to a determination that accuracy of the location data is within a certain threshold (e.g., 10 meters or less). If the accuracy of the location data fails to satisfy the accuracy criterion, the apparatus 102, such as the processing circuitry 106, may be configured to select a larger portion of the audio feature map or, in some embodiments, to select all of the audio feature map. For example, the apparatus 102, such as the processing circuitry 106, of an example embodiment may be configured to select a portion of the audio feature map that is sized in relation to the accuracy of the location data, such as in an inverse relationship to the accuracy of the location data. For example, in this embodiment, as the accuracy of the location data increases, the size of the portion of the audio feature map that is selected is reduced, and as the accuracy of the location data decreases, the size of the portion of the audio feature map that is selected is increased. In certain embodiments, the apparatus 102, such as the processing circuitry 106, can additionally or alternatively be configured to select at least the portion of the audio feature map based on a spatial resolution of the audio feature map. For instance, the apparatus 102, such as the processing circuitry 106, may be configured to dynamically select a size of the portion of the audio feature map based on a number of audio features and/or a density of audio features proximate to the location data, such as in an inverse relationship to the spatial resolution. For example, in this embodiment, as the number of audio features and/or the density of audio features proximate the location data increases, the size of the portion of the audio feature map that is selected is reduced. Furthermore, as the number of audio features and/or the density of audio features proximate the location data decreases, the size of the portion of the audio feature map that is selected is increased. Accordingly, a size of the portion of the audio feature map selected by the apparatus 102, such as the processing circuitry 106, can be dependent upon accuracy of the location data and/or spatial resolution of the audio feature map.

In an embodiment, the amplitude audio signatures can be road noise feature sound files where prominent sounds are digitally represented and/or geo-referenced to a map. A prominent sound can be, for example, a portion of the audio data that is above or below a threshold level by a predefined amount. In certain embodiments, the map database 104 can be associated with a high-definition map. For example, in certain embodiments, the map database 104 can be associated with a separate map layer within a high-definition map. In an aspect, the amplitude audio signatures can correspond to predefined audio events that are parsed/extracted into specific events such as significant changes in decibels (dB) and/or amplitude to demonstrate a road noise event. These amplitude audio signatures can additionally be employed for classification purposes to distinguish events such as cracks in the road versus potholes. In another aspect, the amplitude audio signatures can include audio event data encoded to include a geo-referenced location (e.g., a latitude and/or a longitude), a vehicle speed, a timestamp, a noise floor threshold value, and/or other information associated with predetermined road noise event.

In certain embodiments, at least a portion of an audio feature map can include clustering of amplitude points. For example, at least a portion of an audio feature map can include a geometry with attributes extracted from a cluster of amplitude points. The attributes can include, for example, statistics on a noise floor (e.g., mean and standard deviation), statistics on amplitude (e.g., mean and standard deviation), statistics on vehicle speed (e.g., mean and standard deviation), geometry (e.g., line or polygon—regular or irregular), and/or a list of observation times. The following Table 1 illustrates, for example, information that can be included in an audio feature map for amplitude measurements associated with one or more audio events.

TABLE 1

| Geometry | Std. Dev. Of noise floor | Std. Dev. Of amplitude | Std. Dev. Of vehicle speed | Mean of noise floor | Mean of amplitude | Mean of vehicle speed | Observation times |
|---|---|---|---|---|---|---|---|
| LINESTRING (0 0, 1 1, 2 1, 2 2) | $SD1^{nf}$ | $SD1^{a}$ | $SD1^{vs}$ | $M1^{nf}$ | $M1^{a}$ | $M1^{vs}$ | List of Obs. Times UTC |
| POLYGON (0 0, 1 0, 1 1, 0 1, 0 0) | $SD2^{nf}$ | $SD2^{a}$ | $SD2^{vs}$ | $M2^{nf}$ | $M2^{a}$ | $M2^{vs}$ | List of Obs. Times UTC |

The geometry, e.g., the geometrical shape, associated with an audio event can be beneficial since an audio event is much like a three-dimensional representation of an object on a road (such as, for example, signs, barriers, etc.). As such, with audio data collected from vehicles and stored in the map database, an amplitude audio signature can be represented as an object with a geometry and location of the audio event much like other localization features such as points of interest, guard rails, signs, etc. In an aspect, a geometry associated with audio data can be a series of point-based road noise amplitude observations that is aggregated using clustering. A geometry associated with audio data can also be associated with statistical extraction for a cluster to provide a map layer representation of an audio event for vehicle consumption. A geometry of a cluster can be represented, for example, as a linestring or a polygon with respect to amplitude-based audio events. Audio events may also be associated with other geometrical shapes in other embodiments.

In an example embodiment, data of an audio feature map stored in the map database 104 can be visually represented as illustrated in FIG. 5. FIG. 5 illustrates an example embodiment of a multi-lane roadway 500 with one or more road abnormalities 502. The one or more road abnormalities 502 can be, for example, one or more cracks, one or more potholes, one or more road seams, one or more expansion gaps, and/or one or more other road abnormalities associated with the multi-lane roadway 500. The one or more road abnormalities 502 can, for example, extend laterally across the lanes substantially perpendicular to the travel path of the lanes. According to an embodiment, an audio event associated with an audio feature map stored in the map database 104 can correspond to locations of the one or more road abnormalities 502. In an embodiment, a first road abnormality from the one or more road abnormalities 502 can be associated with a road noise event with an amplitude variance equal to +34 dB, a second road abnormality from the one or more road abnormalities 502 can be associated with a road noise event with an amplitude variance equal to +32 dB, a third road abnormality from the one or more road abnormalities 502 can be associated with a road noise event with an amplitude variance equal to +14 dB, a fourth road abnormality from the one or more road abnormalities 502 can be associated with a road noise event with an amplitude variance equal to +17 dB, and a fifth road abnormality from the one or more road abnormalities 502 can be associated with a road noise event with an amplitude variance equal to +26 dB.

FIG. 6 illustrates locations of audio events 504 sensed in the vicinity of several of the one or more road abnormalities 502. The audio events 504 can be, for example, road noise events. According to FIG. 6, point-based amplitudes are reported by vehicles at specific locations. These point-based reports can be aggregated, in certain embodiments, to form high-level shapes such as lines (seams or cracks across the road in this example), or shapes such as circles or polygons which may identify potholes or manhole covers, for example. Any density-based clustering scheme, such as density-based spatial clustering of applications with noise (DB-SCAN) can be used. The DB-SCAN scheme takes two parameters as inputs: A) points with at least a minimum number of points within a B) distance of a core point. In the specific problem domain, the minimum number of points may be set to two, for example, while the distance may be set to one meter. The two parameters are configurable and the minimum number of points indicates the minimum number of audio events that are required to form a cluster, while the distance is related to the distance between the audio event points.

For clustering, the observation timestamp may also be considered. It is desirable to form clusters from more recent observations. This way, the most recent noise representation of the road may be used for localization. An observation in the last ten years may not be useful for clustering since the road may have deteriorated or improved since a prior point that was gathered a substantial amount of time earlier. The period over which observations may be used may be configurable, and may depend upon the type of observation. In some cases the most recent observations may be observations from the previous X-number of years, where X is configurable, for example. In some cases, the period may be considerably shorter such as a number of months or weeks.

FIG. 7 further illustrates a travel path 506 of a vehicle (e.g., the vehicle 300) along the multi-lane roadway 500. For instance, referring back to block 202 of FIG. 2, the apparatus 102, such as the processing circuitry 106, can determine an audio event (e.g., an audio event from the audio events 504) associated with the one or more road abnormalities 502 as the vehicle (e.g., the vehicle 300) is traveling along the multi-lane roadway 500 via the travel path 506. In one example, the one or more audio sensors 114 (e.g., the audio sensor 302, the audio sensor 304, the audio sensor 306 and/or the audio sensor 308) can detect the audio event (e.g., an audio event from the audio events 504) associated with the one or more road abnormalities 502 as the vehicle (e.g., the vehicle 300) is traveling along the multi-lane roadway 500 via the travel path 506. For example, the apparatus 102, such as the processing circuitry 106, can determine that the audio data provided by the one or more audio sensors 114 (e.g., the audio sensor 302, the audio sensor 304, the audio sensor 306 and/or the audio sensor 308) corresponds to an audio event (e.g., an audio event from the audio events 504) associated with the one or more road abnormalities 502 as the vehicle (e.g., the vehicle 300) is traveling along the multi-lane roadway 500 via the travel path 506. The travel path 506 can be, for example, a travel path for a wheel (e.g., wheel 310, wheel 312, wheel 314 or wheel 316) of the vehicle. Furthermore, it is to be appreciated that a similar travel path can be associated with audio data and/or one or more other audio events for other wheels of the vehicle. In certain embodiments, the audio events 504 can represent a mean or a median of decibel changes of amplitude from aggregated audio data associated with the one or more road abnormalities 502. In certain embodiments, the one or more audio sensors 114 (e.g., the audio sensor 302, the audio sensor 304, the audio sensor 306 and/or the audio sensor 308) can employ a defined distribution of decibel values, as illustrated in FIG. 8, to detect an audio event (e.g., an audio event from the audio events 504). For instance, as illustrated in FIG. 8, the apparatus 102, such as the processing circuitry 106, can determine that audio data provided by the one or more audio sensors 114 (e.g., the audio sensor 302, the audio sensor 304, the audio sensor 306 and/or the audio sensor 308) corresponds to an audio event associated with a road noise event with an amplitude variance equal to +34 dB in response to a determination that an amplitude variance of the audio data is within a decibel range from +31 dB to +37 dB. Furthermore, an amplitude variance of the audio data (e.g., a potential audio event) that is below +31 dB or above +37 dB can be ignored. FIG. 8 illustrates a distribution 800 that includes an x-axis that corresponds to dB and a y-axis that corresponds to probability density. In an embodiment, the distribution 800 can be a probability distribution of amplitude values.

As shown in block 208 of FIG. 2, the apparatus 102 includes means, such as the processing circuitry 106, the memory 108, or the like, configured to compare the amplitude audio signature of the audio data with the amplitude audio signatures of the audio feature map. For instance, the apparatus 102, such as the processing circuitry 106, can employ the amplitude audio signature of the audio data to search the audio feature map or at least the portion of the audio feature map that was selected for one or more audio signatures of the audio feature map that match the amplitude audio signature of the audio data. In an embodiment, the apparatus 102, such as the processing circuitry 106, can compute a probability that the amplitude audio signature of the audio data matches one or more audio signatures of the audio feature map selected based on the location data.

In certain embodiments, the apparatus 102, such as the processing circuitry 106, can compute a probability that amplitude data of the amplitude audio signature of the audio data matches amplitude data of one or more audio signatures of the audio feature map selected based on the location data. In certain embodiments, the apparatus 102, such as the processing circuitry 106, can compute a probability that a statistical representation of an amplitude of the amplitude audio signature of the audio data matches a statistical representation of an amplitude of one or more audio signatures of the audio feature map. For example, in certain embodiments, the apparatus 102, such as the processing circuitry 106, can compute a probability that a standard deviation of an amplitude value of the amplitude audio signature of the audio data matches a standard deviation of an amplitude value of one or more audio signatures of the audio feature map. Additionally or alternatively, in certain embodiments, the apparatus 102, such as the processing circuitry 106, can compute a probability that a mean of an amplitude value of the amplitude audio signature of the audio data matches a mean of an amplitude value of one or more audio signatures of the audio feature map. Additionally or alternatively, in certain embodiments, the apparatus 102, such as the processing circuitry 106, can compare the amplitude audio signature of the audio data with a statistical distribution of amplitudes for the amplitude audio signatures of the audio feature map to identify the amplitude audio signature of the audio feature map that matches the amplitude audio signature of the audio data. As used herein, the amplitude audio signature of the audio feature map is considered to match the amplitude audio signature of the audio data in an instance in which the amplitude audio signature of the audio feature map and the amplitude audio signature of the audio data are equal or differ by no more than a predefined amount.

In an embodiment, the audio feature map can include a distribution of amplitudes for an audio signature at each of a plurality of different locations. For example, the audio feature map can include a first distribution of amplitudes for a first audio signature at a first location associated with a first road abnormality, the audio feature map can include a second distribution of amplitudes for a second audio signature at a second location associated with a second road abnormality, etc. A distribution of amplitudes for an audio signature of the audio feature map can include, for example, a range of different amplitude changes on an x-axis and a count of each of the different amplitude changes on a y-axis. In certain embodiments, a distribution of amplitudes can be a histogram of amplitudes associated with statistics for the distribution of amplitudes (e.g., a standard deviation value, a mean value, etc.). Furthermore, in an embodiment, the apparatus 102, such as the processing circuitry 106, can compare the amplitude audio signature of the audio data to a set of distributions within a certain distance from the location included in the location data. The apparatus 102, such as the processing circuitry 106, can further determine which distribution from the set of distributions includes a highest count for the same type of amplitude change associated with the amplitude audio signature of the audio data.

In an example embodiment, a distribution of amplitudes for an audio signature at each of a plurality of different locations can be visually represented as illustrated in FIG. 9. FIG. 9 illustrates an example embodiment of a multi-lane roadway 900 with a road abnormality 902 and a road abnormality 904. The road abnormality 902 can be, for example, a crack, a pothole, a road seam, an expansion gap, and/or another type of road abnormality associated with the multi-lane roadway 900. Furthermore, the road abnormality 904 can be, for example, a crack, a pothole, a road seam, an expansion gap, and/or another type of road abnormality associated with the multi-lane roadway 900. In an aspect, the audio feature map can include a first distribution 906 of amplitudes for a first audio signature at a first location associated with the road abnormality 902. Additionally, the audio feature map can include a second distribution 908 of amplitudes for a second audio signature at a second location associated with the road abnormality 904. In an embodiment, the apparatus 102, such as the processing circuitry 106, can compare an amplitude audio feature of audio data (e.g., audio data associated with location data proximate to the first location associated with the road abnormality 902 and the second location associated with the road abnormality 904) with the first distribution 906 of amplitudes and the second distribution 908 of amplitudes to determine whether the first distribution 906 or the second distribution 908 includes a highest count for the same type of amplitude change associated with the amplitude audio signature of the audio data.

In certain embodiments, the audio feature map can include multiple distributions at the same location with each distribution associated with a different vehicle speed. For example, in certain embodiments, the audio feature map can include a first distribution of amplitudes at a particular location for a first vehicle speed, the audio feature map can include a second distribution of amplitudes at the particular location for a second vehicle speed, etc. Additionally or alternatively, the audio feature map can include multiple distributions at the same location with each distribution associated with a different environmental conditions. For example, in certain embodiments, the audio feature map can additionally or alternatively include a first distribution of amplitudes at a particular location for a first environmental condition, the audio feature map can include a second distribution of amplitudes at the particular location for a second environmental condition, etc. As described below, in an embodiment in which the audio data including the amplitude audio signature is associated with other sensed parameters, such as the speed of the vehicle and/or the environmental condition at the time and location at which the audio data was captured, the apparatus 102, such as the processing circuitry, may be configured to compare the amplitude audio signature to one or more audio features included within the audio feature map associated with the same speed or a range of speeds that includes the speed of the vehicle that are within a predefined distance of the location at which the audio data was captured and/or to one or more audio features included within the audio feature map associated with the same environmental condition that are within a predefined distance of the location at which the audio data was captured.

In certain embodiments, the apparatus 102, such as the processing circuitry 106, can compute a probability value (e.g., a P-value) of the amplitude audio signature of the audio data matching an amplitude audio signature of the audio feature map. The probability value of the amplitude audio feature can, for example, provide information as to a likelihood that the amplitude audio signature of the audio data matches an amplitude audio feature of the audio feature map, such as a statistical distribution associated with the one or more audio signatures of the audio feature map. In certain embodiments, the probability value of the amplitude audio feature can be compared with a statistical threshold to determine if the probability value is sufficiently high for the amplitude audio signature of the audio data to be determined to match the one or more audio signatures of the audio feature map.

Additionally or alternatively, in certain embodiments, the apparatus 102, such as the processing circuitry 106, can employ other techniques, such as a Kolmogorov-Smirnov technique, to determine whether the amplitude audio signature of the audio data matches one or more amplitude audio signatures of the audio feature map. For example, the apparatus 102, such as the processing circuitry 106, can employ the Kolmogorov-Smirnov technique to compare the similarity between the amplitude audio feature and a statistical distribution associated with the one or more audio signatures of the audio feature map. In certain embodiments, the apparatus 102, such as the processing circuitry 106, can employ the Kolmogorov-Smirnov technique to identify one or more statistical patterns between the amplitude audio feature and one or more audio signatures of the audio feature map.

As shown in block 210 of FIG. 2, the apparatus 102 includes means, such as the processing circuitry 106, the memory 108, or the like, configured to refine, based on the comparison between the amplitude audio signature of the audio data and the amplitude audio signatures of the audio feature map, a location of the vehicle to generate updated location data for the vehicle. For example, the apparatus 102, such as the processing circuitry 106 can improve localization of the vehicle based on the comparison between the amplitude audio signature of the audio data and the amplitude audio signatures of the audio feature map. In an aspect and in response to a determination by the apparatus 102, such as the processing circuitry 106, that the amplitude audio signature of the audio data matches an amplitude audio signature of the audio feature map, the location data for the vehicle can be updated to provide a more accurate location for the vehicle as compared to the location data provided by the one or more sensors 112. In certain embodiments, the updated location data can be transmitted to the vehicle (e.g., the vehicle 300), one or more processors associated with the vehicle, and/or one or more other components associated with the vehicle to facilitate localization of the vehicle.

In an embodiment, the apparatus 102, such as the processing circuitry 106, can refine the location for the vehicle (e.g., update the location data for the vehicle) based on a geo-referenced location associated with the amplitude audio signature of the audio feature map that matches the amplitude audio signature of the audio data. For example, in response to a determination by the apparatus 102, such as the processing circuitry 106, that the amplitude audio signature of the audio data matches a particular amplitude audio signature of the audio feature map, the apparatus, such as the processing circuitry 106 can refine the location for the vehicle based on a geo-referenced location associated with the particular amplitude audio signature of the audio feature map. In one embodiment, the location data can be replaced with the geo-referenced location associated with the amplitude audio signature of the audio feature map that matches the amplitude audio signature of the audio data. In another embodiment, the location data can be weighted based on geo-referenced location associated with the amplitude audio signature of the audio feature map that matches the amplitude audio signature of the audio data. For example, a weighted value to apply to the location data can be determined based on a difference between the location included in the location data and the geo-referenced location associated with the amplitude audio signature of the audio feature map.

In another embodiment, in response to a determination by the apparatus 102, such as the processing circuitry 106, that the amplitude audio signature of the audio data matches an amplitude audio signature of the audio feature map, the apparatus 102, such as the processing circuitry 106, can refine the location data for the vehicle based on vehicle speed data for the vehicle. For example, the apparatus 102, such as the processing circuitry 106, can employ statistics on vehicle speed (e.g., mean and standard deviation) of the vehicle to calculate the updated location data for the vehicle. The vehicle speed data for the vehicle can include a vehicle speed of the vehicle at a time of capturing the audio data via the one or more audio sensors 114. In certain embodiments, the apparatus 102, such as the processing circuitry 106, can select a subset of audio map data associated with the vehicle speed data at a location of the amplitude audio signature of the audio feature map to refine the location data for the vehicle. For example, the audio map data for the amplitude audio signature of the audio feature map can include different audio map data for different vehicle speeds. As such, the vehicle speed data for the vehicle can be employed to select a subset of the audio map data associated with a vehicle speed that corresponds to the vehicle speed data for the vehicle since the amplitude changes that are experienced when vehicles interact with a road abnormality vary based upon the vehicle speed, thereby providing for a more accurate and efficient comparison.

Additionally or alternatively, in an embodiment, apparatus 102, such as the processing circuitry 106, can refine the location data for the vehicle based on environmental data associated with the vehicle. The environmental data can include an environmental condition proximate to the one or more audio sensors 114 at a time capturing the audio data via the one or more audio sensors 114. In one example, the environmental data can include a weather condition associated with the vehicle at a time capturing the audio data via the one or more audio sensors 114. Additionally or alternatively, the environmental data can include a time of day associated with the vehicle at a time capturing the audio data via the one or more audio sensors 114. Additionally or alternatively, the environmental data can include traffic data for a road associated with the vehicle at a time capturing the audio data via the one or more audio sensors 114. In certain embodiments, the apparatus 102, such as the processing circuitry 106, can select a subset of audio map data associated with the environmental data at a location at which the amplitude audio signature was captured for comparison purposes to refine the location data for the vehicle. For example, the audio map data for the amplitude audio signature of the audio feature map can include different audio map data for different environmental conditions. As such, the environmental data for the vehicle can be employed to select a subset of the audio map data associated with an environmental condition that corresponds to the environmental conditions experience by the vehicle when the amplitude audio signature was captured.

In certain embodiments, the apparatus 102, such as the processing circuitry 106, can refine the location for the vehicle (e.g., the apparatus 102, such as the processing circuitry 106, can generate the updated location data) in a longitudinal direction with respect to a road associated with the vehicle, such as in the lengthwise direction in which the road extends. For example, in an embodiment where a first audio sensor (e.g., the audio sensor 302) associated with a first wheel (e.g., the wheel 310) on a first side of the vehicle captures first audio data and a second audio sensor (e.g., audio sensor 304) associated with a second wheel (e.g., the wheel 312) on a second side of the vehicle and mounted on the same axle as the first wheel captures second audio data at approximately the same time (e.g., at equal times equal or times that differ by no more than a predefined amount), the apparatus 102, such as the processing circuitry 106, can refine the location for the vehicle (e.g., the apparatus 102, such as the processing circuitry 106, can generate the updated location data) in a longitudinal direction with respect to a road associated with the vehicle since the first audio data and the second audio data are likely related to the same road abnormality (e.g., a seam in a road surface or a transition to a different road surface) that extends laterally across the road.

In certain embodiments, the apparatus 102, such as the processing circuitry 106, can refine the location for the vehicle (e.g., the apparatus 102, such as the processing circuitry 106, can generate the updated location data) in a latitudinal direction with respect to a road associated with the vehicle, e.g., in a side-to-side direction across the road. For example, in an embodiment where a first audio sensor (e.g., the audio sensor 302) associated with a first wheel (e.g., the wheel 310) on a first side of the vehicle captures first audio data at a first time and a second audio sensor (e.g., audio sensor 306) associated with a second wheel (e.g., the wheel 314) also on the first side of the vehicle captures second audio data at a second time, the apparatus 102, such as the processing circuitry 106, can refine the location for the vehicle (e.g., the apparatus 102, such as the processing circuitry 106, can generate the updated location data) in a latitudinal direction with respect to a road associated with the vehicle in order to provide, for example, improved vehicle localization in a side-to-side direction across the road.

FIG. 10 illustrates an example embodiment of an architecture specifically configured for implementing embodiments described herein. The illustrated embodiment of FIG. 10 may be vehicle-based, where audio data 1002 is obtained from the one or more audio sensors 114 (e.g., the audio sensor 302, the audio sensor 304, the audio sensor 306 and/or the audio sensor 308) of the vehicle (e.g., the vehicle 300) traveling along a road segment (e.g., the multi-lane roadway 500). In an embodiment, the audio data 1002 can be associated with road noise data associated with the one or more wheels of the vehicle to facilitate identifying road anomalies and/or surface transitions through amplitude analysis. The location of the collected audio data 1002 along the road segment may be determined through location determination using GPS or other localization techniques and correlated to map data of the map data service provider 408. A vehicle with autonomous or semi-autonomous control may establish accurate location through the use of audio events to facilitate the autonomous or semi-autonomous control.

As illustrated in FIG. 10, the architecture includes the map data service provider 408 that provides map data 1025 (e.g., HD maps and policies associated with road links within the map) to an Advanced Driver Assistance System (ADAS) 1005, which may be vehicle-based or server based depending upon the application. The map data service provider 408 may be a cloud-based 1010 service. The ADAS 1005 receives location data 1003 (e.g., navigation information and/or vehicle position) and may provide the location data 1003 to map matcher 1015. The map matcher 1015 may correlate the vehicle position to a road link on a map of the mapped network of roads stored in the map cache 1020. This link or segment, along with the direction of travel, may be used to establish which HD map policies are applicable to the vehicle associated with the ADAS 1005, including sensor capability information, autonomous functionality information, etc. Accordingly, policies for the vehicle are established based on the current location and the environmental conditions (e.g., traffic, time of day, weather). The map data 1025 associated with the road segment specific to the vehicle are provided to the vehicle control, such as via the CAN (computer area network) BUS (or Ethernet or Flexray) 1040 to the electronic control unit (ECU) 1045 of the vehicle to implement HD map policies, such as various forms of autonomous or assisted driving, or navigation assistance. In certain embodiments, a data access layer 1035 can manage and/or facilitate access to the map cache 1020, the map data 1025, and/or a map database 1030. In an embodiment, at least a portion of the map database 1030 can correspond to the map database 104 and/or the map database 410.

By employing vehicle localization via amplitude audio features in accordance with one or more example embodiments of the present disclosure, precision and/or confidence of vehicle localization for a vehicle (e.g., the vehicle 300) can be improved. Furthermore, by employing vehicle localization via amplitude audio features in accordance with one or more example embodiments of the present disclosure, improved navigation of a vehicle can be provided, improved route guidance for a vehicle can be provided, improved semi-autonomous vehicle control can be provided, and/or improved fully autonomous vehicle control can be provided. Moreover, in accordance with one or more example embodiments of the present disclosure, efficiency of an apparatus including the processing circuitry can be improved and/or the number of computing resources employed by processing circuitry can be reduced.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations can be included. Modifications, additions, or amplifications to the operations above can be performed in any order and in any combination.

Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed:

1. A computer-implemented method for vehicle localization based on amplitude audio features, the computer-implemented method comprising:
   determining an amplitude audio signature of audio data received from one or more audio sensors of a vehicle;
   determining location data associated with the vehicle;
   selecting, based on the location data for the vehicle, at least a portion of an audio feature map that stores amplitude audio signatures associated with road noise in relation to respective locations;
   comparing the amplitude audio signature of the audio data with the amplitude audio signatures of the audio feature map; and
   refining, based on the comparison between the amplitude audio signature of the audio data and the amplitude audio signatures of the audio feature map, a location of the vehicle to generate updated location data for the vehicle.

2. The computer-implemented method of claim 1, wherein the determining the amplitude audio signature comprises determining the amplitude audio signature in response to determining that a degree of variance of a decibel value associated with the audio data is above a noise threshold value.

3. The computer-implemented method of claim 1, wherein the determining the amplitude audio signature comprises determining the amplitude audio signature in response to detection of a road noise event associated with an abnormality in a road surface associated with the vehicle.

4. The computer-implemented method of claim 1, wherein the refining the location for the vehicle comprises updating the location data for the vehicle based on vehicle speed data for the vehicle and the comparison between the amplitude audio signature of the audio data and the amplitude audio signatures of the audio feature map.

5. The computer-implemented method of claim 1, wherein the refining the location for the vehicle comprises:
   determining that the amplitude audio signature of the audio data matches a particular amplitude audio signature of the audio feature map; and
   refining the location for the vehicle based on a georeferenced location associated with the particular amplitude audio signature of the audio feature map.

6. The computer-implemented method of claim 1, wherein the refining the location for the vehicle comprises comparing a probability value for the amplitude audio signature of the audio data with statistical values for the amplitude audio signatures of the audio feature map.

7. The computer-implemented method of claim 1, wherein the refining the location for the vehicle comprises comparing the amplitude audio signature of the audio data with a statistical distribution of the amplitude audio signatures of the audio feature map.

8. The computer-implemented method of claim 1, wherein the audio data is first audio data received from a first audio sensor associated with a first wheel of the vehicle, and wherein the determining the amplitude audio signature comprises:
   determining a first amplitude audio signature of the first audio data; and
   determining a second amplitude audio signature of second audio data received from a second audio sensor associated with a second wheel of the vehicle.

9. The computer-implemented method of claim 8, wherein the first audio sensor captures the first audio data and the second audio sensor captures the second audio data at approximately a same time, wherein the first wheel is associated with a first side of the vehicle, wherein the second wheel is associated with a second side of the vehicle, and wherein the refining the location for the vehicle comprises refining the location for the vehicle in a longitudinal direction with respect to a road associated with the vehicle.

10. The computer-implemented method of claim 8, wherein the first audio sensor captures the first audio data at a first time and the second audio sensor captures the second audio data at a second time, wherein the first wheel and the second wheel are both associated with a same side of the vehicle, and wherein the refining the location for the vehicle comprises refining the location for the vehicle in a latitudinal direction with respect to a road associated with the vehicle.

11. An apparatus configured to provide vehicle localization based on amplitude audio features, the apparatus comprising processing circuitry and at least one memory including computer program code instructions, the computer program code instructions configured to, when executed by the processing circuitry, cause the apparatus to:
   determine an amplitude audio signature of audio data received from one or more audio sensors of a vehicle;

determine location data associated with the vehicle;
select, based on the location data for the vehicle, at least a portion of an audio feature map that stores amplitude audio signatures associated with road noise in relation to respective locations;
compare the amplitude audio signature of the audio data with the amplitude audio signatures of the audio feature map; and
refine, based on the comparison between the amplitude audio signature of the audio data and the amplitude audio signatures of the audio feature map, a location of the vehicle to generate updated location data for the vehicle.

12. The apparatus of claim 11, wherein the computer program code instructions are further configured to, when executed by the processing circuitry, cause the apparatus to refine the location for the vehicle based on vehicle speed data for the vehicle and the comparison between the amplitude audio signature of the audio data and the amplitude audio signatures of the audio feature map.

13. The apparatus of claim 11, wherein the computer program code instructions are further configured to, when executed by the processing circuitry, cause the apparatus to refine the location for the vehicle based on environmental data for the vehicle and the comparison between the amplitude audio signature of the audio data and the amplitude audio signatures of the audio feature map.

14. The apparatus of claim 11, wherein the computer program code instructions are further configured to, when executed by the processing circuitry, cause the apparatus to:
determine that the amplitude audio signature of the audio data matches a particular amplitude audio signature of the audio feature map; and
refine the location for the vehicle based on a geo-referenced location associated with the particular amplitude audio signature of the audio feature map.

15. The apparatus of claim 11, wherein the computer program code instructions are further configured to, when executed by the processing circuitry, cause the apparatus to compute a probability that the amplitude audio signature of the audio data matches the amplitude audio signatures of the audio feature map.

16. The apparatus of claim 11, wherein the computer program code instructions are further configured to, when executed by the processing circuitry, cause the apparatus to compare a probability value for the amplitude audio signature of the audio data with statistical values for the amplitude audio signatures of the audio feature map.

17. The apparatus of claim 11, wherein the computer program code instructions are further configured to, when executed by the processing circuitry, cause the apparatus to compare the amplitude audio signature of the audio data with a statistical distribution of the amplitude audio signatures of the audio feature map.

18. A computer program product comprising at least one non-transitory computer-readable storage medium having computer-executable program code instructions stored therein, the computer-executable program code instructions comprising program code instructions to:
determine an amplitude audio signature of audio data received from one or more audio sensors of a vehicle;
determine location data associated with the vehicle;
select, based on the location data for the vehicle, at least a portion of an audio feature map that stores amplitude audio signatures associated with road noise in relation to respective locations;
compare the amplitude audio signature of the audio data with the amplitude audio signatures of the audio feature map; and
assist localization of the vehicle based on the comparison between the amplitude audio signature of the audio data and the amplitude audio signatures of the audio feature map.

19. The computer program product of claim 18, further comprising program code instructions to assist the localization of the vehicle based on vehicle speed data for the vehicle and the comparison between the amplitude audio signature of the audio data and the amplitude audio signatures of the audio feature map.

20. The computer program product of claim 18, further comprising program code instructions to assist the localization of the vehicle based on environmental data for the vehicle and the comparison between the amplitude audio signature of the audio data and the amplitude audio signatures of the audio feature map.

* * * * *